(12) United States Patent
Kim et al.

(10) Patent No.: US 7,027,828 B2
(45) Date of Patent: Apr. 11, 2006

(54) METHOD FOR CONTROLLING POWER OF TFCI FIELD FOR DSCH IN 3G STANDARD MOBILE COMMUNICATION SYSTEM

(75) Inventors: Bong-Hoe Kim, Ansan-si (KR); Sung-Lark Kwon, Seoul (KR); Seung-Hoon Hwang, Seoul (KR); Dug-In Lyu, Seoul (KR); Dong-Wook Roh, Seoul (KR); Jin-Young Park, Goonpo-si (KR); Eun-Jung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 09/988,050

(22) Filed: Nov. 16, 2001

(65) Prior Publication Data

US 2002/0061764 A1    May 23, 2002

(30) Foreign Application Priority Data

| Nov. 18, 2000 | (KR) | ............................... 2000-68669 |
| Jan. 13, 2001 | (KR) | ............................... 2001-2039 |
| Aug. 27, 2001 | (KR) | ............................... 2001-51675 |
| Oct. 23, 2001 | (KR) | ............................... 2001-67290 |

(51) Int. Cl.
*H04B 7/00* (2006.01)

(52) U.S. Cl. .................. 455/522; 455/69; 455/436; 455/437; 455/439; 455/442; 455/525; 370/318; 370/331

(58) Field of Classification Search ................ 455/522, 455/436, 439, 442, 525, 69, 437; 370/318, 370/331
See application file for complete search history.

(56) References Cited

U.S. PATENT DOCUMENTS

| 6,085,108 A | 7/2000 | Knutsson et al. | ............ 455/522 |
| 6,650,905 B1 * | 11/2003 | Toskala et al. | ............. 455/522 |
| 2001/0036823 A1 * | 11/2001 | Van Lieshout et al. | ...... 455/418 |

FOREIGN PATENT DOCUMENTS

WO      WO 99/41850      8/1999

OTHER PUBLICATIONS

TSG-RAN Working Group 3 Meeting #11 Radio Interface Parameter Updates Feb. 28—Mar. 3, 2000.*
"3rd Generation Partnership Project; Technical Specification Group Radio Access Network; Enhancement on the DSCH Hard Split Mode," 3G TR R3.005 V0.2.1 (Nov. 2001) (XP-002239081).
"DSCH Power Control Improvement in Soft Handover: Proposed Draft TR, 3rd Generation Partnership Project Technical Specification Group Radio Access Network; DSCH Power Control Improvement in Soft Handover," 3G TR 25.841 V1.1.0 (Oct. 2000) (XP-002239080).

* cited by examiner

*Primary Examiner*—Nay Maung
*Assistant Examiner*—Raymond S. Dean
(74) *Attorney, Agent, or Firm*—Fleshner & Kim, LLP

(57) ABSTRACT

In a mobile communication system including SRNC and DRNC for controlling a plurality of base station, and mobile stations, a method for controlling power of TFCI field for DSCH if DSCH-associated DCH exists in a soft handover situation includes determining whether a base station which transmits DSCH is a primary base station or not, number of base stations that transmits TFCI2, where the TFCI2 is information on the DSCH, setting a power offset according to a result of the determination, and transmitting the TFCI2 using the set power offset.

23 Claims, 44 Drawing Sheets

FIG.5
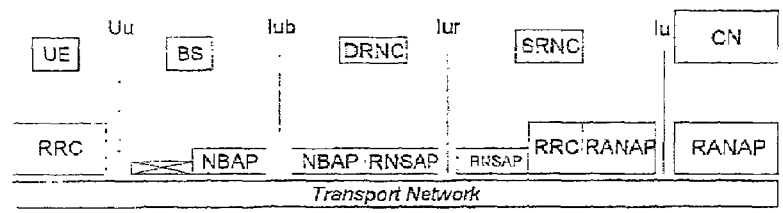
FIG.6
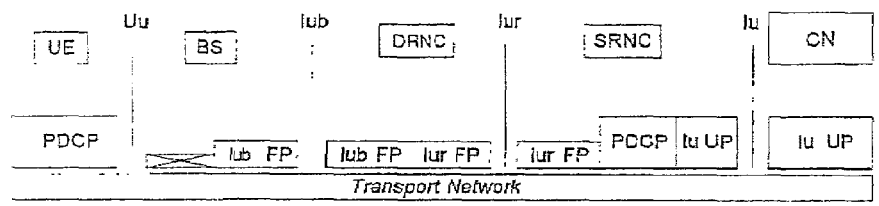
FIG.7
| Control frame class | Coding |
|---|---|
| Outer loop power control | 0000 0001 |
| timing adjustment | 0000 0010 |
| DL synchronization | 0000 0011 |
| UL synchronization | 0000 0100 |
| DL signalling for DSCH | 0000 0101 |
| DL Node synchronization | 0000 0110 |
| UL Node synchronization | 0000 0111 |
| Rx Timing Deviation | 0000 1000 |
| Radio Interface Parameter Update | 0000 1001 |
| Timing Advance | 0000 1010 |

| Slot Format #| | Channel Bit Rate (kbps) | Channel Symbol Rate (ksps) | SF | Bits/ Slot | DPDCH Bits/Slot | | DPCCH Bits/Slot | | | Transmitted slots per radio frame $N_{Tr}$ |
|---|---|---|---|---|---|---|---|---|---|---|
| | | | | | $N_{Data1}$ | $N_{Data2}$ | $N_{TPC}$ | $N_{TFCI}$ | $N_{Pilot}$ | |
| 0 | 15 | 7.5 | 512 | 10 | 0 | 4 | 2 | 0 | 4 | 15 |
| 1 | 15 | 7.5 | 512 | 10 | 0 | 2 | 2 | 2 | 4 | 15 |
| 2 | 30 | 15 | 256 | 20 | 2 | 14 | 2 | 0 | 2 | 15 |
| 3 | 30 | 15 | 256 | 20 | 2 | 12 | 2 | 2 | 2 | 15 |
| 4 | 30 | 15 | 256 | 20 | 2 | 12 | 2 | 0 | 4 | 15 |
| 5 | 30 | 15 | 256 | 20 | 2 | 10 | 2 | 2 | 4 | 15 |
| 6 | 30 | 15 | 256 | 20 | 2 | 8 | 2 | 0 | 8 | 15 |
| 7 | 30 | 15 | 256 | 20 | 2 | 6 | 2 | 2 | 8 | 15 |
| 8 | 60 | 30 | 128 | 40 | 6 | 28 | 2 | 0 | 4 | 15 |
| 9 | 60 | 30 | 128 | 40 | 6 | 26 | 2 | 2 | 4 | 15 |
| 10 | 60 | 30 | 128 | 40 | 6 | 24 | 2 | 0 | 8 | 15 |
| 11 | 60 | 30 | 128 | 40 | 6 | 22 | 2 | 2 | 8 | 15 |
| 12 | 120 | 60 | 64 | 80 | 12 | 48 | 4 | 8* | 8 | 15 |
| 13 | 240 | 120 | 32 | 160 | 28 | 112 | 4 | 8* | 8 | 15 |
| 14 | 480 | 240 | 16 | 320 | 56 | 232 | 8 | 8* | 16 | 15 |
| 15 | 960 | 480 | 8 | 640 | 120 | 488 | 8 | 8* | 16 | 15 |
| 16 | 1920 | 960 | 4 | 1280 | 248 | 1000 | 8 | 8* | 16 | 15 |

FIG.24

|   | 7 |   |   |   |   |   |   | 0 | Number of Bytes |
|---|---|---|---|---|---|---|---|---|---|
| Radio Interface Parameter Update Flags | | | | | | | | | 1 |
| 15 | 14 | 13 | 12 | 11 | 10 | 9 | | 8 | |
| Radio Interface Parameter Update Flags | | | | | | | | | 1 |
| 7 | 6 | 5 | 4 | 3 | 2 | 1 | | 0 | |
| CFN | | | | | | | | | 1 |
| Spare bits 6-7 | | DPC Mode | | TPC PO | | | | | 1 |
| Spare | | | TFCI PO | | | | | | 1 |
| Spare | | | TFCI PO_primary | | | | | | 1 |
| Spare Extension | | | | | | | | | 0..32 |

Payload ≥ 6 Bytes

FIG.25

|   | 7 |   |   |   |   |   |   | 0 | Number of Bytes |
|---|---|---|---|---|---|---|---|---|---|
| DSCH TFCI Power Control Flags | | | | | | | | | 1 |
| 7 | 6 | 5 | 4 | 3 | 2 | 1 | | 0 | |
| Spare | | | TFCI PO | | | | | | 1 |
| Spare | | | TFCI PO_primary | | | | | | 1 |
| Spare Extension | | | | | | | | | 0..32 |

Payload ≥ 3 Bytes

METHOD FOR CONTROLLING POWER OF TFCI FIELD FOR DSCH IN 3G STANDARD MOBILE COMMUNICATION SYSTEM

BACKGROUND OF THE INVENTION

1. Field of the Invention

The present invention relates to a power control method of a mobile communication system, and in particular, to a method for controlling power of a Transport Format Combination identifier (TFCI) for a Downlink Shared Channel (DSCH) based on existence of handovers, main base station, and reception of transmit power control (TPC) signals from base stations.

2. Description of the Related Art

FIG. 1 is a block diagram for illustrating soft handover between base stations located in the same radio network controller (RNC) (intra RNS, Inter Node B Soft handover) in a conventional wireless network As shown in FIG. 1, a serving RNC (SRNC) 106, located in a universal mobile telecommunication system (UMTS) under a core network (CN) 101, controls dedicated radio resources assigned to a mobile station (UE) 110 in a serving radio network subsystem (SRNS) 104.

If the mobile station 110 moves from a service area of a base station 108 to a service area of another base station 109, both base stations 108 and 109 demodulate signals from the mobile station 110 and send the demodulated frames to the SRNC 106. The SRNC 106 can select an optimal one among the received frames. In this manner, the mobile station 110 can maintain a communication channel by communicating with two base stations 108 and 109. In this case, the SRNC 106 and the base stations 108 and 109 are included in the SRNS 104.

FIG. 2 is a block diagram illustrating a soft handover between two different radio network subsystems (RNSs) in another conventional wireless network.

As shown in FIG. 2, the mobile station 110 is able to maintain a communication channel with two base stations 109 and 116 that are located in different RNSs during the soft handover, when a serving radio network controller (SRNC) 106 and a drifting radio network controller(DRNC) 114 control a plurality of respective base stations 108, 109, 116, and 118. In this case, the SRNC 106 controls dedicated radio resources assigned to the base stations 108 and 109 located in the DRNS 112, and the DRNC 114 provides radio resources to the mobile station 110 when it moves from the DRNS 104 to the DRNS 112. The SRNC 106 and the DRNC 114 are located in the SRNS 104 and DRNS 112.

As described above, each of the RNCs 106 and 114 includes a plurality of base stations, and the mobile station 110 simultaneously maintains communications with the two base stations located within the respective RNSs 104 and 112. In this case, even though the handover occurs between two base stations, the mobile station always performs communication with at least two base stations.

The third generation partnership project (3GPP) standard specifies a downlink shared channel (DSCH) for the burst data type.

FIG. 3 shows a DSCH frame format. As shown in FIG. 3, the DSCH format has a length of 10 ms and each frame can be used by different users assigned with a channelization code.

Also, the DSCH frame having a code indicating a predetermined data rate can be assigned to just one user at any time. Accordingly, a specific mobile station occupying the DSCH performs the power control by itself.

Typically, the DSCH operates together with a Dedicated CHannel (DCH). That is, the mobile station that occupies the DSCH must have the DCH. The mobile station measures the power of DCH received from the base station and responsively generates and transmits a Transmit Power Control (TPC) signal to the base station such that the base station updates DCH power on the basis of the TPC. Also, the base station can update the DSCH power according to the updated DCH power. This kind of DCH operating with the DSCH is called as an associated DCH.

FIG. 4 shows a DCH frame format. As shown in FIG. 4, the DCH frame length ($T_f$) is 10 ms and the each frame consists of 15 time slots (slot#0~slot#14); Accordingly, the length of one time slot ($T_{slot}$) is 2560 chips. Also, the DCH is related with alternately repeating dedicated physical data channels (DPDCHs) and dedicated physical control channels (DPCCHs). The DPCCH can include a TPC field ($N_{TPC}$ bit), TFCI field ($N_{TFCI}$), and pilot field. The TFCI field includes the present channel information. For example, the TFCI field can indicate the data length and a coding type of the present frame.

Through the DCH and DSCH, the user's data for one user are transmitted at the same times a TFCI information (TFCI1) about the DCH and another TFCI information (TFCI2) about the DSCH are transmitted in the TFCI field at the same time. For this purpose, a TFCI field in one time slot can be divided into two halves for the TFCI1 and TFCI2.

There are two methods for transmitting the TFCI1 and TFCI2. The first method is transmitting the TFCI1 and TFCI2 in one code word on the basis of second order Reed Muller coding. This method is called Logical Split Mode.

The second method is generating two code words for respective TFCI1 and TFCI2 on the basis of a first order Reed Muller coding and transmit the two code words after mixing them in bit. This method is called Hard Split Mode. In case where the DCH is transmitted by the base stations in different radio network controllers, the second method is used for transmitting the TFCI2. In this case, the TFCI2 can be transmitted in some part of the whole wireless link. That is, the TFCI2 cannot be transmitted in the DCH of which radio network controller differ from the radio network controller that transmits the DSCH. Accordingly, in the Hard Split Mode, preferably different power controls should be used for TFCI1 and TFCI2, and also to control the DSCH power.

Typically, the DCH supports the soft handover, while the DSCH cannot support the soft handover. In the event that the DCH is in the soft handover state and the DSCH is transmitted from just one base station, it is required to perform different power controls to the DCH and DSCH. That is, the DCH generates TPC signal by summing the power from the base station, however, the DSCH power control is impossible through the TPC signal because the DSCH is transmitted from just one base station. For this reason, a particular power control different from the conventional one is required for the DSCH.

There are two methods for controlling the DSCH power control. The first is operating the SSDT (site selection diversity transmit) only in the uplink. When the mobile station performs soft handover, the mobile station measures the powers from every base station using the SSDT to select one base station that transmits the strongest power as a primary base station, and responsively transmitting to the RNC through a physical signaling. In this case, only the primary base station continues to transmit information and the non-primary base stations stop the transmissions. The operation in uplink means that the primary base station selection signal is transmitted in uplink, but there is no power on/off operation in downlink.

In this case, the DSCH power control can be performed in two modes. When the base station transmitting the present DSCH is the primary base station, the DSCH is transmitted in a little stronger power than the standard power. This power can be varied according to the TPC generated according to the DCH. On the other hand, if the base station is non-primary, then much higher power offset can be assigned. The power offset value can be highly set in order to receive the whole area of a cell.

In the second method, the mobile station generates TPC signals for both the DCH and DSCH and sends them to the base station. However, in the second method there is a problem in which the mobile station must measure the DSCH power as well as the DCH.

Now, the operation of power control in the downlink will be described in detail. Firstly, the mobile station measures a signal to interference ratio (SIR) of the DCH and compares the measured signal to the interference ratio ($SIR_{est}$) to a target signal to ratio ($SIR_{target}$). If $SIR_{est}$ is greater than $SIR_{target}$, the mobile station transmits TPC signal of '0,' to the base station. On the other hand, if $SIR_{est}$ is less than $SIR_{target}$, the mobile station transmits TPC signal of '1.' Thus, the base station adjusts the DCH power on the basis of received TPC signal according to equation 1.

$$P(k)=P(k-1)+P_{tpc}(k) \qquad \text{Equation 1}$$

The present DCH power is obtained by subtracting or adding the power ($P_{tpc}(k)$) adjusted by the TPC signal from/to the previous power $P(k-1)$. That is, $P_{tpc}(k)$ is $+\Delta TPC$ when $TPC_{est}(k)$ is 1, and $P_{tpc}(k)$ is $-\Delta TPC$ when when $TPC_{est}(k)$ is 0. That is, the DCH power is increased as much as $\Delta TPC$ when the measured $SIR_{est}$ is less than the $SIR_{target}$, the DCH power is decreased as much as $\Delta TPC$ when the measured $SIR_{est}$ is greater than the $SIR_{target}$.

The power of TFCI field of DPCCH on the basis of the present DCH power P(k) cab be expressed as equation 2.

$$P_{TFCI}(k)=P(k)+PO1 \qquad \text{Equation 2}$$

where, the PO1 is a power offset between DPDCH and TFCI field. That is, the power of TFCI of the DPCCH is obtained by adding the power offset PO1 to the present DCH power. Accordingly, the conventional DSCH power control method can be adapted to the TFCI2 power control. The TFCI field belongs to the DPCCH such that the power control is performed in same manner.

As described above, the TFCI field can be TFCI1 and TFCI2. However, in DSCH split mode TFCI performance can be degraded because the TFCI2(TFCI of the DSCH) may not be transmitted from all of the base stations. In other words, since the TFCI field contains information about the number of data bits and coding method of the present frame, the data in the wireless frame cannot be detected if the TFCI field is not accurately received. In this case, the information on a spreading factor or data length cannot be transmitted.

On the other hand, during the soft handover of the mobile station, the power control is performed on the basis of the sum of power from all of the base stations that consist an active set. But, the TFCI2 is not transmitted from all of the base station but only from some of them. Accordingly, it is difficult to adjust the TFCI2 power to maintain at the predetermined quality.

In the conventional power control system, the power offset of the TFCI field can be performed only in the radio link setup and the DPCH power control is performed on the basis of the preset power offset. That is, since the power offset of the TFCI field for the DPCH is adjusted, it is impossible to assign another power if the channel environment or the active set topology has been changed.

Furthermore, even if strong power has been assigned to maintain the quality of the TFCI field, this results in waste of power since it does not adjust but fix the power level of the TFCI.

Now, a method for signaling the power offset obtained as above.

The communication protocols can be classified into control plane (see FIG. 5) and user plane (see FIG. 6) protocols because typically the control signaling for the system control and the end-user data are transmitted in different channels. The control plane protocol is a protocol being used in the wireless among the UTMS protocols. As shown in FIG. 5, the control plane protocol consists of radio resource control (RRC), radio access network application part (RANAP), radio network subsystem application part (RNSAP), and node B application part (NBAP).

In FIG. 5, the RRC is used between the mobile station UE and RNC, the NBAP is used between the base station Node B and the RNC as a Iub interface protocol, the RNSAP is used between RNCs as a Iur interface protocol, and the RANAP is used between the RNC and CN as an Iu interface protocol. These radio network control plane protocols exist under a client-server environment. At the Iu interface, the UTRAN acts as a radio access server and the CN acts as a client requiring access services to the UTRAN. Also, at the Iub interface the base station and the RNC are a server and client, respectively, and at the Iur interface the DRNC and the SRNC respectively act as a server and client. These protocols can include various control messages for the radio access bearer resources in the service areas between the base stations and RNCs, and between CN and RNCs.

Among the user plane protocols is a frame protocol (FP) for carrying UMITS user data frame. As shown in FIG. 6, the FP consists of Iub FP, Iur FP, and Iu user plane protocol (Iu UP) using at respective interfaces. These protocols perform various control function and uplink and downlink data transmission. For example, among these functions are timing adjustment and synchronization as in the asynchronous European CDMA. Also, these protocols have a function of transmitting the outer loop power control command to the mobile station.

FIG. 7 shows control frames used in the user plane protocol for DCH in the 3GPP Iur/Iub interface. As shown in FIG 7, there are ten kinds of control frames for outer loop power control, timing adjustment, DL synchronization, UL synchronization, DL signaling for DSCH, DL node synchronization, UL node synchronization, Rx timing deviation, radio interface parameter update, and timing advance. And each control frame is distinguished 8 bit coding information. Among the control frames the radio interface parameter update is used for updating the 8 bit connection frame number (CFN), 5 bit transmit power control (TPC) power offset, and 1 bit downlink power control (DPC) mode information (see FIG. 8). Also, the control frame format comprises 4 byte of payload.

The signaling using the control frame in the user plane has some advantages as the reaction is quicker than the signaling in the control plane and the size of the message is smaller. However, the signaling using the control frame in the user plane is unreliable. The control information transmitted from the control plane is called "control message," and the control information transmitted from the user plane is called "control frame."

FIG. 9a to FIG. 9d are block diagrams illustrating channel connection states between the base stations and the mobile station during the DSCH hard handover or an associated soft handover of DCH when the mobile station moves into a service area of new RNC. FIG. 9a shows a channel state before the soft handover of DCH associated with the DSCH, and FIG. 9b shows the channel state during the soft handover of DCH associated with the DSCH and before the DSCH hard handover. FIG. 9c shows the DSCH hard handover, and FIG. 9d shows the channel state after the soft handover of DCH associated with the DSCH.

FIG. 10a and FIG. 10b are drawings of the conventional signaling procedures during in which the associated DCH soft handover performs according to the movement of the mobile station (UE) without the DSCH hard handover as in the FIG. 9a and FIG. 9b.

In the conventional signaling procedure, the power control to the TFCI in DSCH hard split mode, Is not independently performed but the TFCI power offset on the basis of NBAP and RNSAP of control plane of initial radio link setup is always used regardless of the movement of the mobile station or the number of radio links for transmitting the TFCI2.

Even though there have been many suggestions for performing TFCI power control in the DSCH hard split mode, any effective method compatible to the radio access network (RAN) interface standard of 3GPP have not been developed yet.

Also, for the TFCI power control in the DSCH hard split mode, it is required to use the message transmission method between the Node B and RNC and between RNCs as described above. Unfortunately, there is no guideline about power controlling message to the TFCI in the DSCH hard split mode and an operation procedure thereof. As a result, there are confusions in developing 3GPP asynchronous system and terminal using the TFCI power control in the DSCH hard split mode based on conventional technology.

SUMMARY OF THE INVENTION

The present invention has been made in an effort to solve the above problems of the prior art.

It is an object of the present invention to provide a control method of increasing reliability of the control information for a downlink shared channel by adding additional control signal.

Still, it is another object of the present invention to provide a method controlling transmitting power of control information of a downlink shared channel, when additional control signal is not available.

Still, it is another object of the present invention to provide a power control method using the TFCI for the DSCH according to the number of radio links, the number of base stations which send, TFCI2, and the handover situation.

Still, it is another object of the present invention to provide a signaling method for send a power offset set according to the power control method to a control plane and user plane.

To achieve the above object, in a wireless communication system in which a first base station transmits data to a plurality of mobile stations through one communication channel and transmits control information of the communication channel via at least one control channel, transmitting the control information of the downlink shared channel of the first base station to the mobile station by a second base station, if the mobile station and the second base station are under communication, and the second base station transmits data to a plurality of mobile stations via it's own downlink shared channel and transmits the control information of the downlink shared channel of the second base station via a control channel.

According to the method, the control information is transmitted from the first base station to the second base station and the transmission of the control information is conducted between the first RNC that controls the first base station and the second RNC that controls the second base station. Herein, the first RNC transmits the control information using control frame of user plane or control message of control plane.

According to another embodiment of the present invention, in a wireless communication system in which a first base station transmits data to a plurality of mobile stations through one communication channel and transmits control information to a communication channel via control channel, a method controlling transmitting power of control information of downlink shared channel to a mobile station, by increasing the transmission power of the channel including the control information that the first base station transmits, if the mobile station and a second base station are under communication, and the second base station does not transmit the control information of the downlink shared channel of the first base station to the mobile station.

According to the method, if the second base station is one of the active base station for handover, the increase of transmission power depends on a ratio of the number of the active base station that does not transmit the control information to the number of the whole active base station.

Also, the first RNC decides the transmission status of the control information and transmits the control information to the first base station.

According to the method, if the second base station is one of the active base station for handover, the channel including the control information that the third base station transmits by increasing the transmission power to a predetermined level is transmitted, if the communication is conducted between one of the mobile stations and the third base station through the control channel, and the third base station transmits the control information of the communication channel of the first base station to the mobile station.

BRIEF DESCRIPTION OF THE DRAWINGS

The accompanying drawings, which are incorporated in and constitute a part of the specification, illustrate an embodiment of the invention, and together with the description, serve to explain the principles of the invention.

FIG. 5 is block diagram showing a control plane protocol stack used in a UMTS radio network;

FIG. 6 shows user plane protocol stack using in a UMTS radio network;

FIG. 7 is a table showing control frames used in the user plane protocol for DCH at an interface of the 3GPP standard;

FIG. 24 shows a control frame format for a modified Radio Interface Parameter Update according to a third embodiment of the present invention;

FIG. 25 shows a newly added control frame format for a DSCH TFCI power control according to the third embodiment of the present invention;

DETAILED DESCRIPTION OF THE PREFERRED EMBODIMENTS

A preferred embodiment of the present invention will be described hereinafter with reference to the accompanying drawings.

Typically, a downlink power control is performed by controlling the DPCCH and DPDCH powers at the same time. The DPCCH and DPDCH powers are adjusted so as to be identical to each other in strength and their relative ratio does not change.

However, when the DSCH-associated DCH is in the soft handover, a different type of power control is needed. That is, the TFCI field which includes TFCI2 should be controlled by another type of power control in order to maintain the TFCI field reception quality.

The base station transmitting the DSCH surely transmits the TFCI2, but other base stations that do not send the DSCH may or may not send the TFCI2.

The present invention relates to TFCI power control method for the DSCH for performing the power control corresponding to the number of radio links, the number of base stations which send TFCI2, and the handover situation and a signaling method for transmitting power offset set on the basis of the power control method. In the present invention, two different methods for the TFCI power control for DSCH that are effective in the handover of 3GPP system are being considered.

In the first method, the TFCI2 is transmitted from only the base station that transmits the DSCH (Case 1), and in the second method TFCI2 is transmitted from several base stations (Case 2).

In the first method, the TFCI2 is transmitted from the base station that transmits the DSCH.

In this case, since only the TFCI2 power transmitted from one base station is adjusted without considering an active set topology, enough power can be assigned thereto.

In the first method, the TFCI2 power is adjusted based on whether or not the mobile station (UE) is in a handover mode. That is, the transmission is performed in a predetermined power level when the mobile station is in the handover mode, and the transmission is performed at the relatively lower power level during the ordinary times. In this case the TFCI field power offset as a new signaling is set by higher layer information, and the TFCI field power offset value can be changed.

In the second method, the TFCI field is assigned with power in different levels according to the mode of the mobile station.

Figure 1:
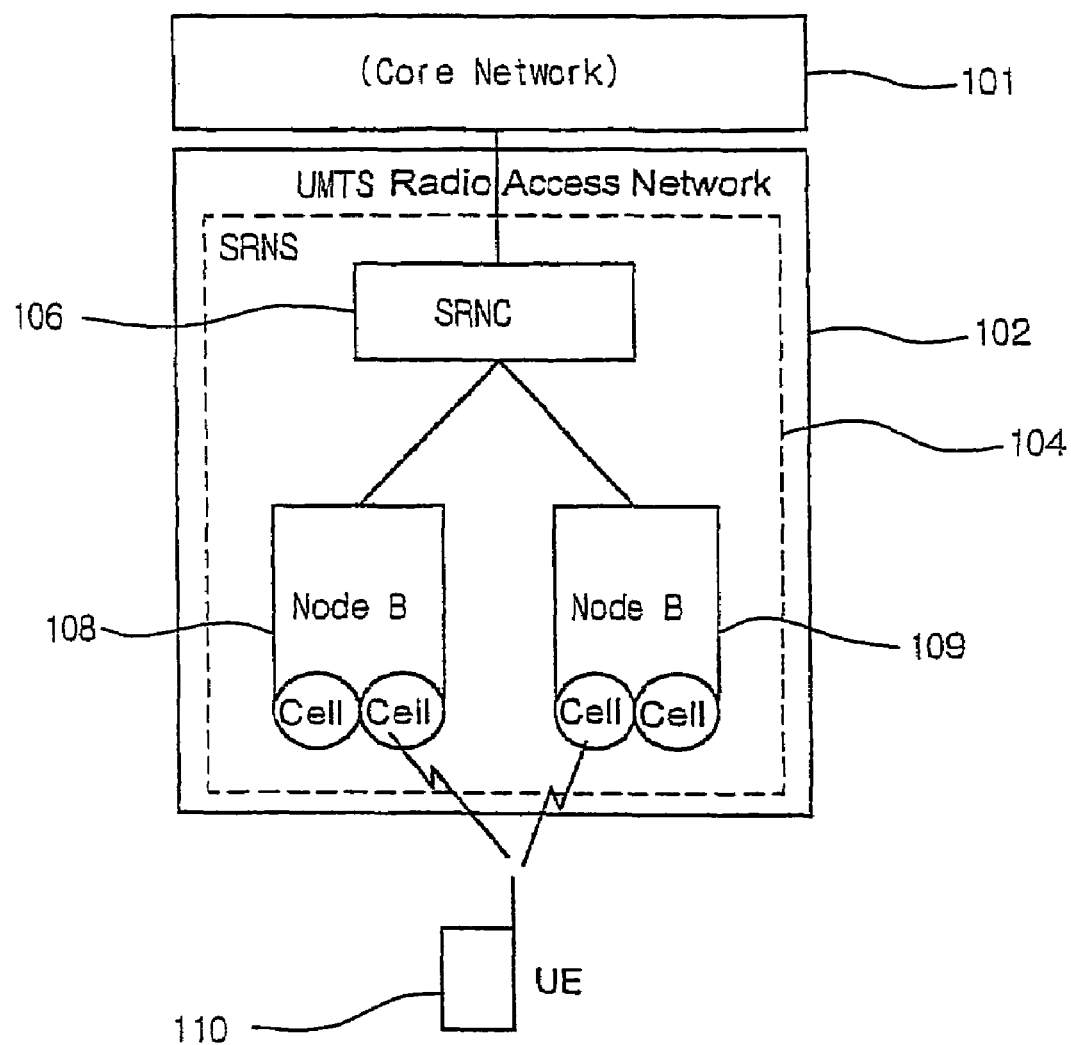
FIG. 1 is a block diagram illustrating a radio access network during a soft handover between two base stations under control of one RNC.
Figure 2:
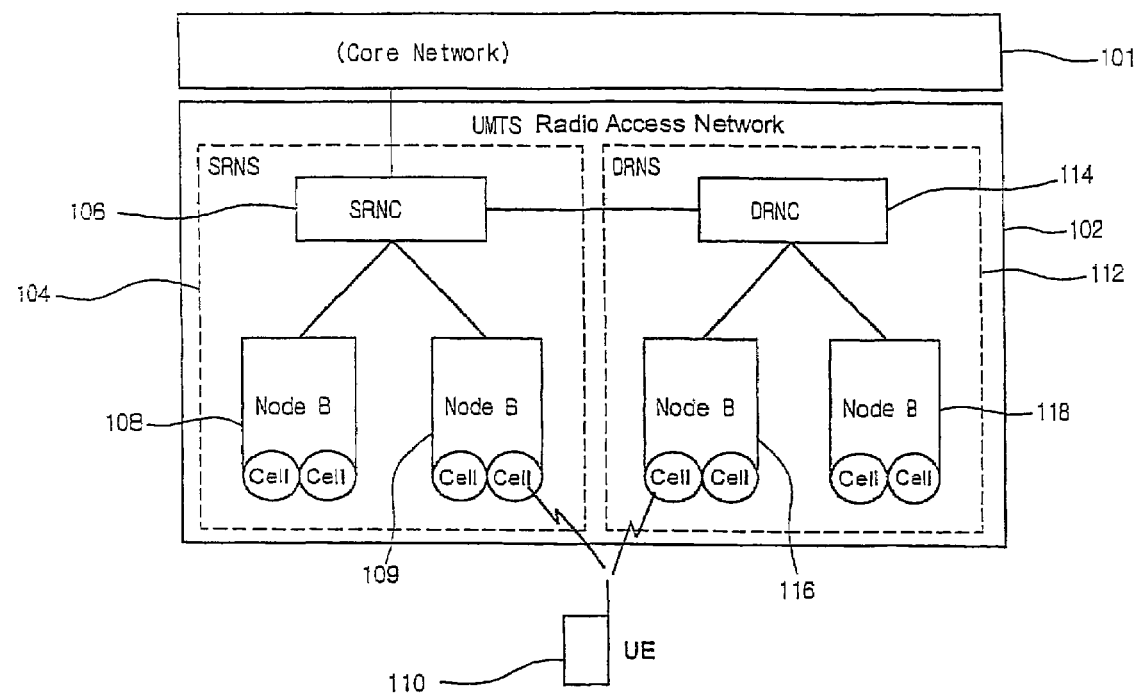
FIG. 2 is a block diagram illustrating a radio access network during a soft handover between the base stations respectively controlled by different RNC.
Figure 3:
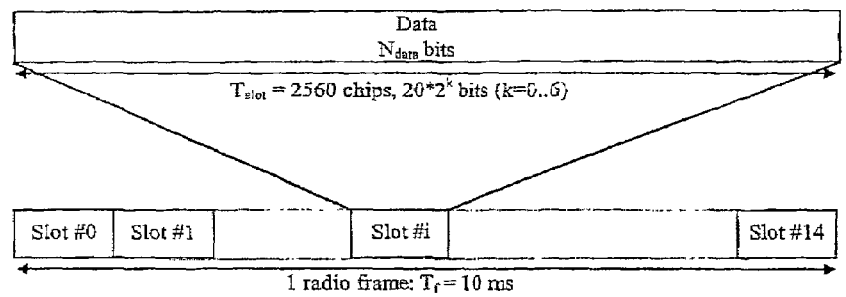
FIG. 3 is a block diagram showing a DSCH format.
Figure 4:
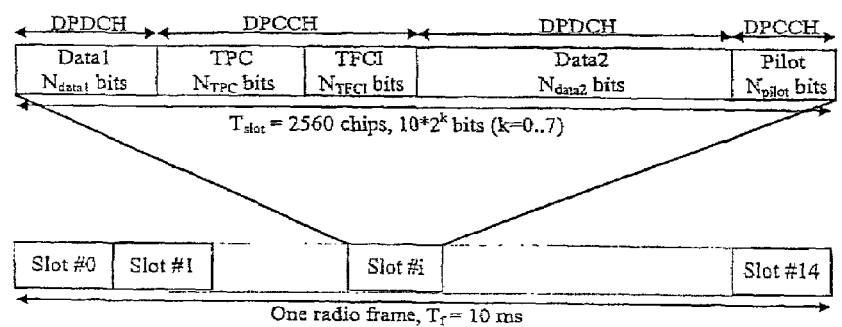
FIG. 4 is a block diagram showing a DCH format.

As shown in FIG. 4, even though the power adjustment to the DPCCH and DPDCH of other parts except for the TFCI field can be performed using the conventional power control method, different power controls are adapted for the TFCI field according to the mode of mobile station.

The mobile station (UE) operates the SSDT for the uplink, measures the power level from the base stations, and selects the base station having the highest power level as a primary base station. If the selected primary base station is the one which transmits the DSCH, then the TFCI2 power control is performed with other fields of the DPCCH in the same manner. Otherwise, the TFCI2 having a predetermined power level can be transmitted from the base station to the mobile station. The TFCI2 power can be expressed through the following equation 3 and 4.

In case where the primary base station transmits DSCH.

$$P_{TFCI}(k)=P(k)+PO1+Pp \qquad \text{Equation 3}$$

In case the primary base station does not transmits DSCH.

$$P_{TFCI}(k)=Pnp \qquad \text{Equation 4}$$

where, Pp is a parameter for the transmission in higher power level than that of the standard TFCI field power, and Pnp is a parameter for performing transmission in a predetermined power level when the base station is not the primary base station and the mobile station is in the state of handover. P(k) is the present DCH power, and PO1 is the power offset between the DPDCH and the TFCI field.

As shown in equations 3 and 4, the TFCI2 is transmitted in much higher power level when the base station is the non-primary base station.

If the SSDT mode is not operated, the TFCI2 can be transmitted in a predetermined power level by setting the base station which transmits the DSCH as the non-primary base station regardless of the existence of the primary base station. Through the same manner as the first method, by setting the TFCI field power offset as a new signaling to the primary/non-primary cell and changing the TFCI field offset value, the TFCI2 power control can be performed in this type of case.

As for the TFCI2 power setting, the power can be assigned as the followings according to whether the base station is primary one or not.

In the event that the base station which transmits the DSCH is a primary base station, the TFCI field power for the DSCH can be expressed through equation 5.

$$P_{TFCI}(k)=P(k)+Pp \qquad \text{Equation 5}$$

Also, in case where the base station which transmits the DSCH is a non-primary base station, the TFCI field power for the DSCH can be expressed as equation 6.

$$P_{TFCI}(k)=P(k)+Pnp \qquad \text{Equation 6}$$

where, Pp is the power offset when the base station which transmits the DSCH is the primary base station, whereas Pnp is the power offset when the base station which transmits the DSCH is the non-primary station.

If the base station which transmits the DSCH is the non-primary base station, then the transmission can be performed by setting the Pnp higher in consideration with the boundary of cells. Or, the TFCI field can be transmitted at the maximum level if the Pnp value is set at higher than power that can be assigned to the TFCI field for the DSCH.

In the third method, the power controls of the DSCH and DCH are performed by different TPC messages.

The mobile station (UE) separately generates a transmission power control (TPC1) for the DSCH except for the TFCI field and a transmission power control (TPC2) for the DSCH. For this reason, the mobile station (UE) measures two kinds of powers. That is the mobile station power of the DCH except for the TFCI field and DSCH power. Firstly, the mobile station measures SIR using a pilot signal of the DPCCH in order to generate a TPC message for the DCH. Also, the mobile station uses the DSCH for measuring the DSCH power. In case of using DSCH, the SIR can be easily measured since the transmission is continuously performed with strong power. However, there are frames that do not carry the DSCH such that it is difficult to measure the SIR. Even though the TFCI2 occupies a little portion of a slot, the SIR can be measured in every frame because the TFCI2 is continuously transmitted. Accordingly, the TPC message to the DSCH can be generated by measuring power of the TFCI2.

The DCH power except for the TFCI field can be expressed as follow equation 7.

$$P1(k)=P1(k-1)+P_{TPC1}(k) \qquad \text{Equation 7}$$

In equation 7, the present power (P1(k)) of the DCH except for the TFCI field can be obtained by adding or subtracting the power ($P_{TPC1}(k)$) adjusted by the TPC1 to or from the previous power (P1(k−1)). That is, the $P_{TPC1}(k)$ becomes +ΔTPC when the $TPC1_{est}(k)$ is 1, and $P_{TPC1}(k)$ becomes −ΔTPG when the $TPC1_{est}(k)$ is 0. In more detail, if the measured signal to interference ratio ($SIR_{est}$) is less than the target signal to interference ratio ($SIR_{target}$), then the power of the DCH except for the TFCI is increased as much as +ΔTPC. On the other hand, if the $SIR_{est}$ is greater than the $SIR_{target}$, then the power of the DCH except for the TFCI is decreased as much as +ΔTPC.

The DSCH power can be expressed as following equation 8.

$$P2(k)=P2(k-1)+P_{TPC2}(k) \qquad \text{Equation 8}$$

In equation 8, the present power (P2(k)) of the DSCH is obtained by adding or subtracting the adjusted power ($P_{TPC}(k)$) to or from the previous set power (P2(k−1)). That is, the $P_{TPC2}(k)$ becomes +ΔTPC when the $TPC2_{est}(k)$ is 1, the $P_{TPC2}(k)$ becomes −ΔTPC when the $TPC2_{est}(k)$ is 0. In more detail, if the measured signal to interference ratio ($SIR_{est}$) is less than the target signal to interference ratio ($SIR_{target}$), then the power of the power of the TFCI2 is increased as much as +ΔTPC. On the other hand, if the $SIR_{est}$ is greater than the $SIR_{target}$, then the power of the TFCI2 is decreased as much as +ΔTPC.

Accordingly, the power of the TFCI2 on the basis of the DSCH can be expressed as following equation 9.

$$P_{TFCI}(k)=P2(k)+PO1 \qquad \text{Equation 9}$$

where, PO1 is a power offset between the DPDCH and TFCI field.

As shown in equation 9, the power of the TFCI2 is obtained by adding the power offset to the DSCH power.

Figure 10A:
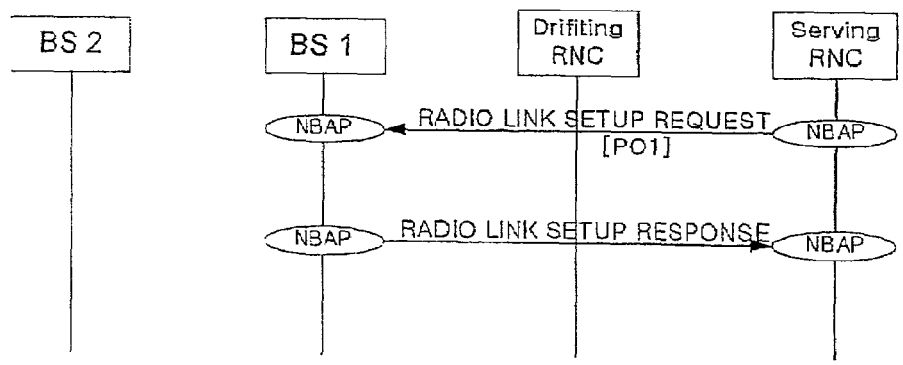
FIG. 10a and FIG. 10b are drawings for illustrating conventional signaling procedures of respective associated DCH soft handover and DSCH without a hard handover as in FIG. 9a and FIG. 9b.
Figures 10B, 11:
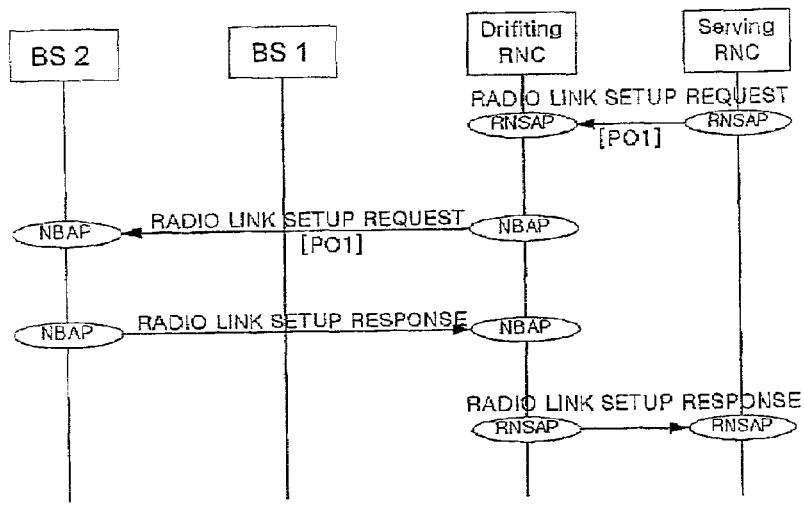
FIG. 11 is a table for illustrating data structures of a DPDCH and DPCCH.

When the powers of the TFCI2 and TFCI1 are separately controlled, real and imaginary part signals of one symbol have respective powers in different levels. This is exemplary generated when two bits are assigned to the TFCI field (see FIG. 11). If the whole of the TFCI field is adjusted into the DSCH power (P2), the above problem can be resolved. That is, the TFCI1 and TFCI2 are included in the TECI field of the DCH such that two kinds of information are transmitted with one symbol. In this case, the TFCI field including two TECI bits is adjusted according to the transmission power control (TPC2) message generated for TFCI2 power control.

While the TFCI2 power can be adjusted by a separate control signal other that the TCP message. If the power control to the DSCH is performed by transmitting the measured SIR or cyclic redundancy check (CRC) from the mobile station to the base station, the TFCI2 power control can be performed by working together with the DSCH power control.

In case where the base station transmits the DSCH, both the above-explained first and second methods can be adapted regardless of whether or not the handover of the mobile station exists. That is, regardless whether or not the handover of the mobile station exists, the two methods assigning power to the TFCI2 in different power levels according to the selected mode of the mobile and assigning power to the TFCI2 in different levels according to the TPC messages generated on the basis of the DSCH and DCH are adopted.

Also, the power offset can be differently set depending on whether the base station which transmits the DSCH is primary or non-primary base station.

(case 2) The TFCI2s are transmitted from a plurality of base stations.

The power of the TFCI field is adjusted according to the conditions of the base stations, in the present active set, that transmit the TFCI2. In this case, the system should be reset if the active set topology is changed. Accordingly, when the TFCI2s are transmitted from a plurality of base stations in the active set, the power of each TFCI field can be controlled using the power offset that has been differently assigned according to a ratio of the base stations that transmit the TFCI2 fields to all the base stations in the active set. The assignment of the power offset is performed in consideration with a diversity gain and power control gain.

For example, if the number of base stations that transmit the TFCI1 are ten and the number of base stations among those ten base stations that also transmit the TFCI2 are three, then the present power offset is calculated by adding 7/10 of the previous power offset to the previous power offset. Also, if the number of the base stations that transmit the TFCI2 are five, the present power offset is obtained by adding 5/10 of the previous power offset to the previous power offset.

In this manner, if the number of the base stations that transmit the TFCI increases, the power offset of the TFCI2 decreases inversely proportional to the number of the base stations, and if the number of the base stations that transmit the TFCI decreases, the power offset of the TFCI2 increases.

Now, the methods for signaling the information related to controlling the power of the TFCI2 will be explained. Generally, these methods use protocols such as the NBAP and RNSAP for indicating the power control type for the TFCI2 For this reason, control information called "TFCI power control indicator" (TFCI PC Indicator) is added to the radio link setup request and the radio link reconfiguration prepare messages. In case the TFCI PC Indicator of the DSCH TFCI is "on" state it indicates that the DSCH TFCI power control to radio links that are newly set or reset is being operated, and if the TFCI PC indicator is in "off" state the DSCH TFCI power control is not being performed.

Now, the signaling methods according to the preferred embodiments of the present invention will be described hereinafter.

<Embodiment 1>

This relates to signaling procedure of the TFCI power offset for the DPCCHs that transmit the TFCI2 when the soft handover is performed between RNC that includes a base station in which the DCH transmits the DSCH and another RNC.

As the first method (Method-1a), a new type of control frame to which a new field is added to the user plane for carrying the TFCI power offset value used for the DPCCHs which transmits the TFCI2 values when the associated DCH soft handover is performed. In case the R99/R4's general TFCI power offset value should be signaled after the handover, a general TFCI power offset value could be carried by the corresponding field.

Figure 8:
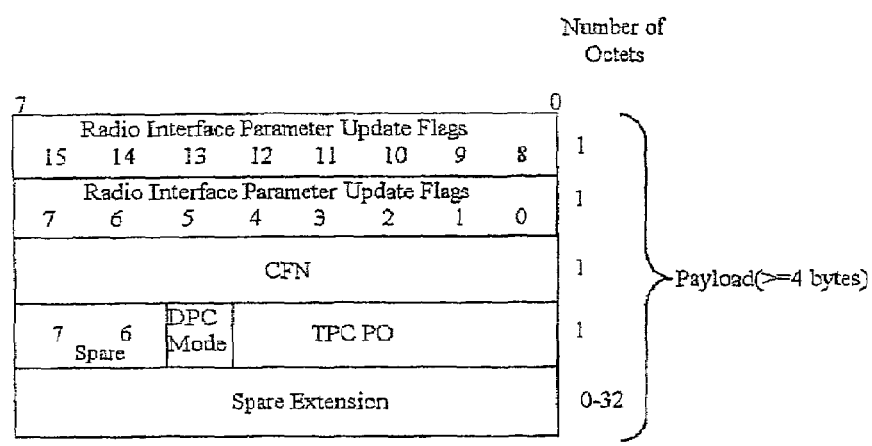
FIG. 8 is a table showing a conventional Radio Interface Parameter Update control frame format.
Figure 9A:
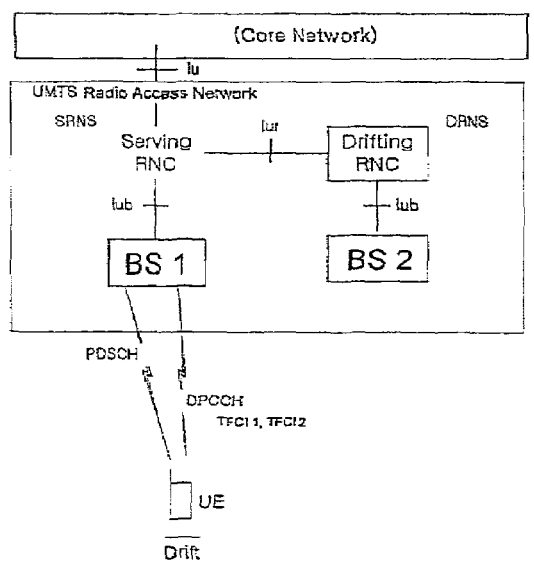
FIG. 9a to FIG. 9d are block diagrams for illustrating channel establishments between a mobile station and base stations according to a DSCH hard handover and an associated DCH soft handover while a mobile station moves from one service area to another under control of different RNC.
Figure 9B:
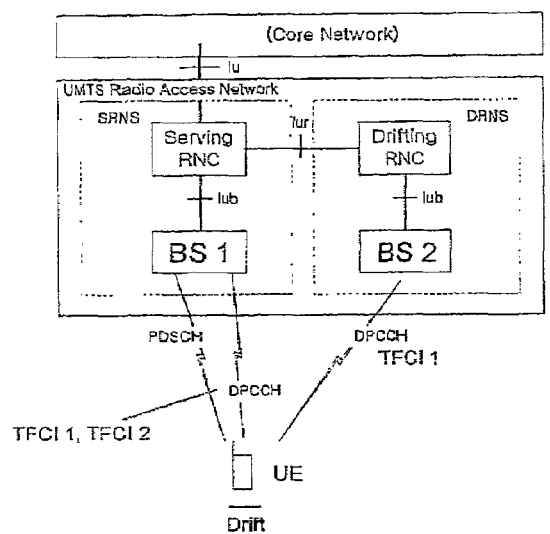
Figure 9C:
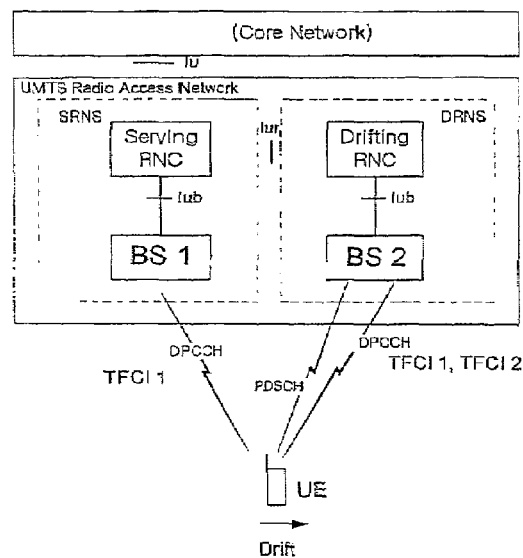
Figure 9D:
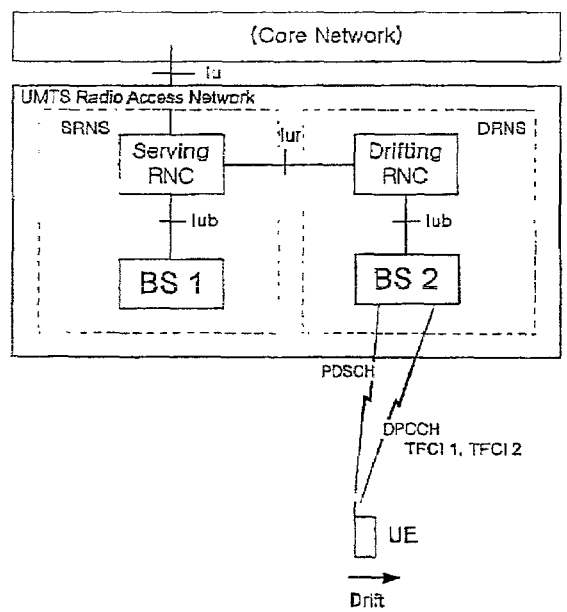

To carry the TFCI power offset value, new fields for TFCI power control can be added to the conventional Radio Interface Parameter Update frame of FIG. 8 as the first procedure, or another control frame for the TFCI power control can be created in the DSCH hard split mode as the second procedure. In these cases, a requirement is the information about the TFCI power offset generally adapted for the DCH and the TFCI power offset adapted to the DPCCHs that transmit the TFCI2 during the soft handover of the associated DCH. The newly added power offset parameter must be updated by a newly calculated value, when the number of the links belonged to the active set is changed, or the number of the links through which the TFCI2s are transmitted is changed according to the change of the radio link configuration by the handover. In this method, the R99/R4's general TFCI power offset value is carried by the corresponding field when the general TFCI power offset value should be used after the handover. Now the method can be explained in two respective procedures.

According to the first procedure, a Radio Interface Parameter Update control frame format (see FIG. 12) modified from the conventional one (see FIG. 8) is used. In this new control frame, the third bit of Radio Interface Parameter Update flags field indicates whether or not the TFCI power offset (TFCI PO) exists in the fifth byte thereof. In this first procedure, the R99/R4's general TFCI power offset value is carried in the corresponding field when the general TFCI power offset should be used after the handover.

Figure 13:
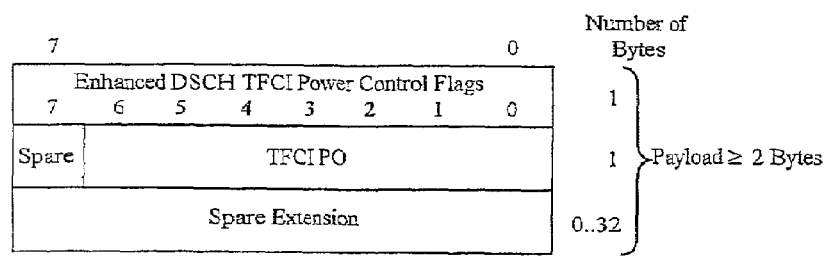
FIG. 13 shows a newly added control frame format for a DSCH TFCI power control according to the first embodiment of the present invention.
Figure 14A:
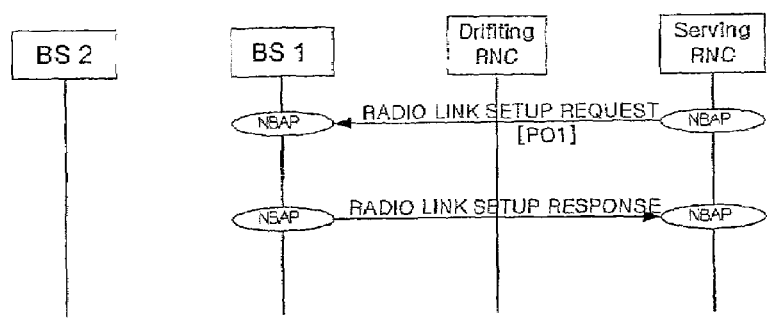
FIG. 14a to FIG. 14d are drawings for illustrating a signaling procedure according to the first embodiment of the present invention.
Figure 14B:
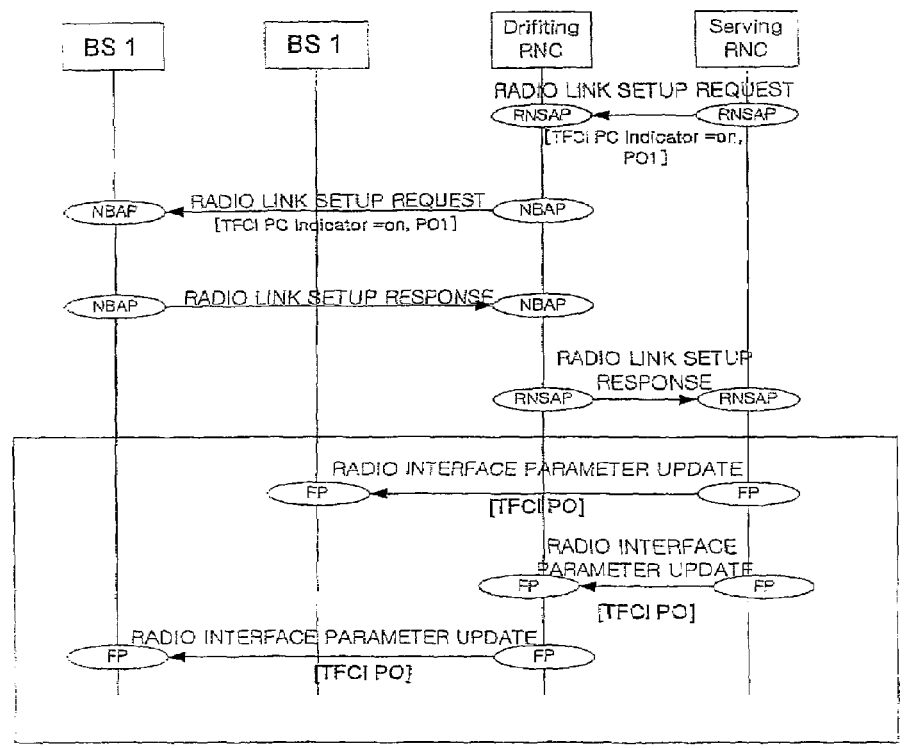
Figure 14C:
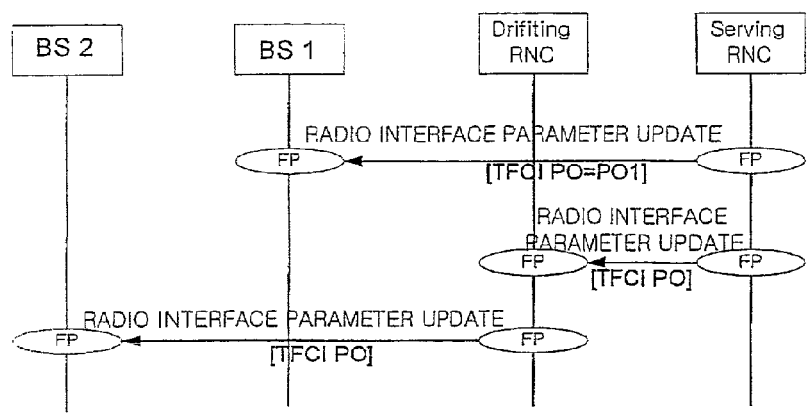
Figure 14D:
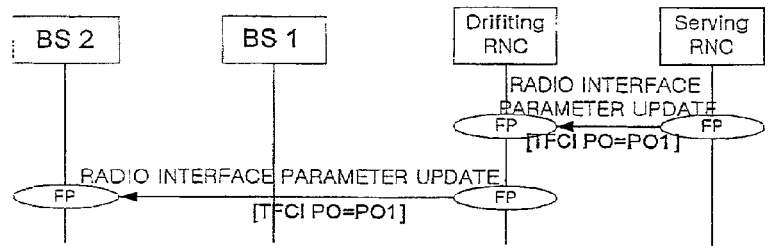
Figure 15A:
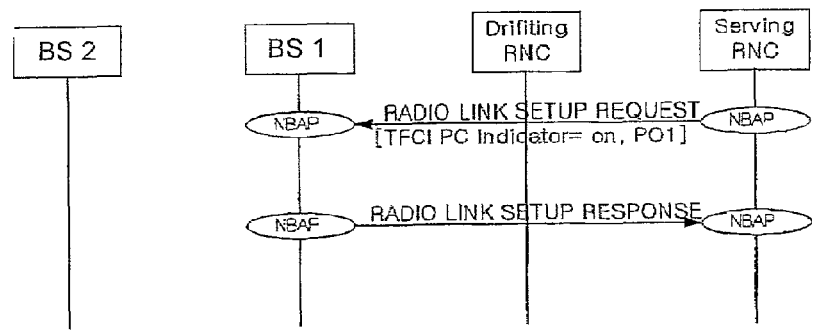
FIG. 15a to FIG. 15d are drawings for illustrating another signaling procedure according to the first embodiment of the present invention.
Figure 15B:
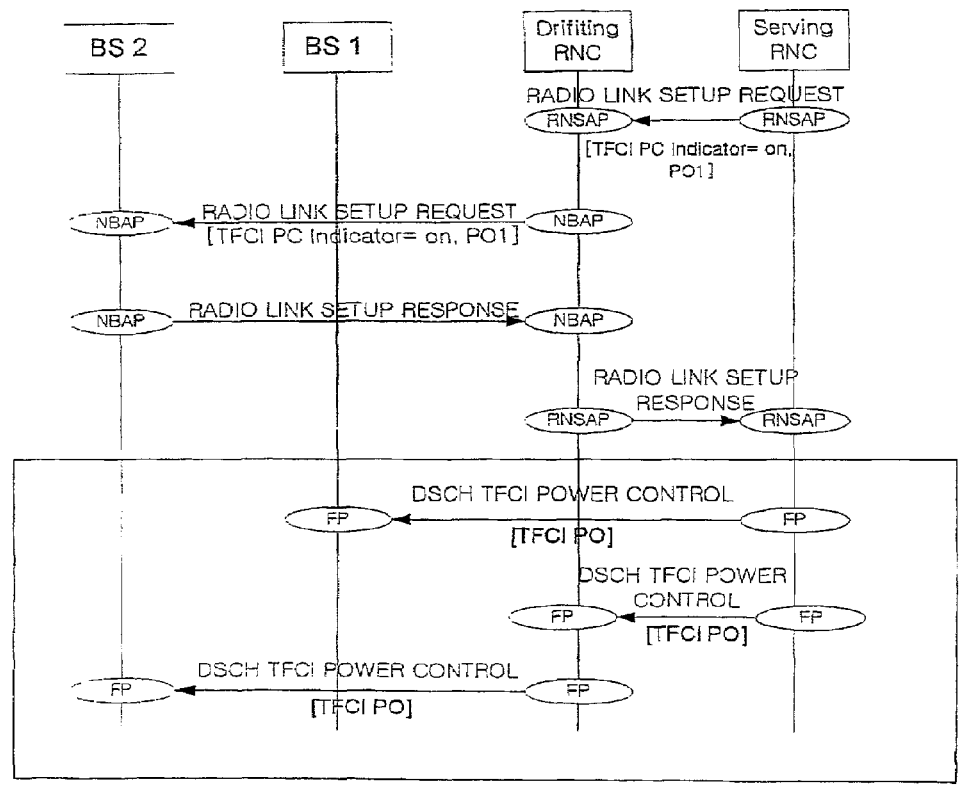
Figure 15C:
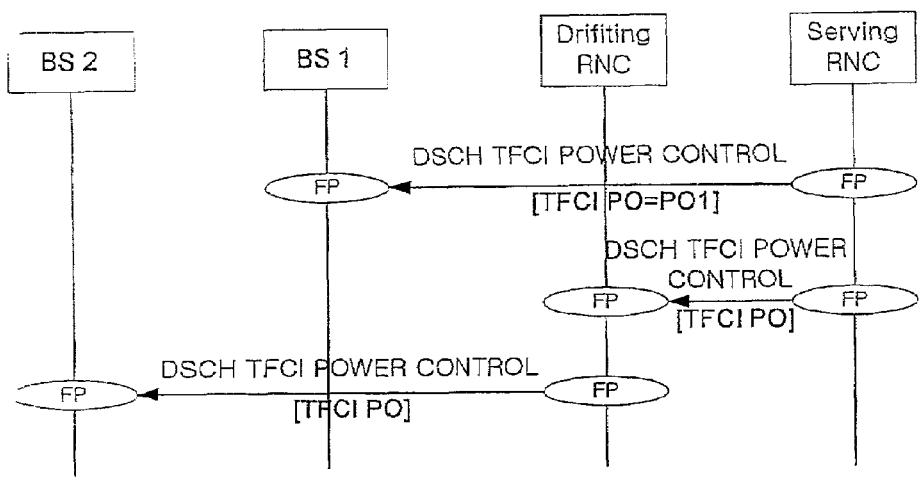
Figure 15D:
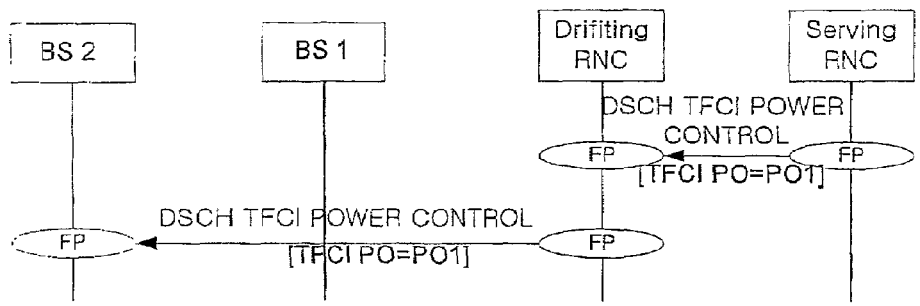
Figure 16A:
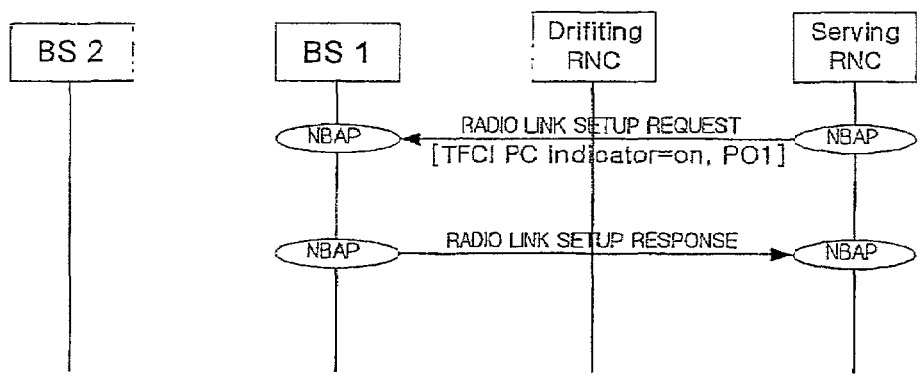
FIG. 16a to FIG. 16d are drawings for illustrating another signaling procedure according to the first embodiment of the present invention.
Figure 16B:
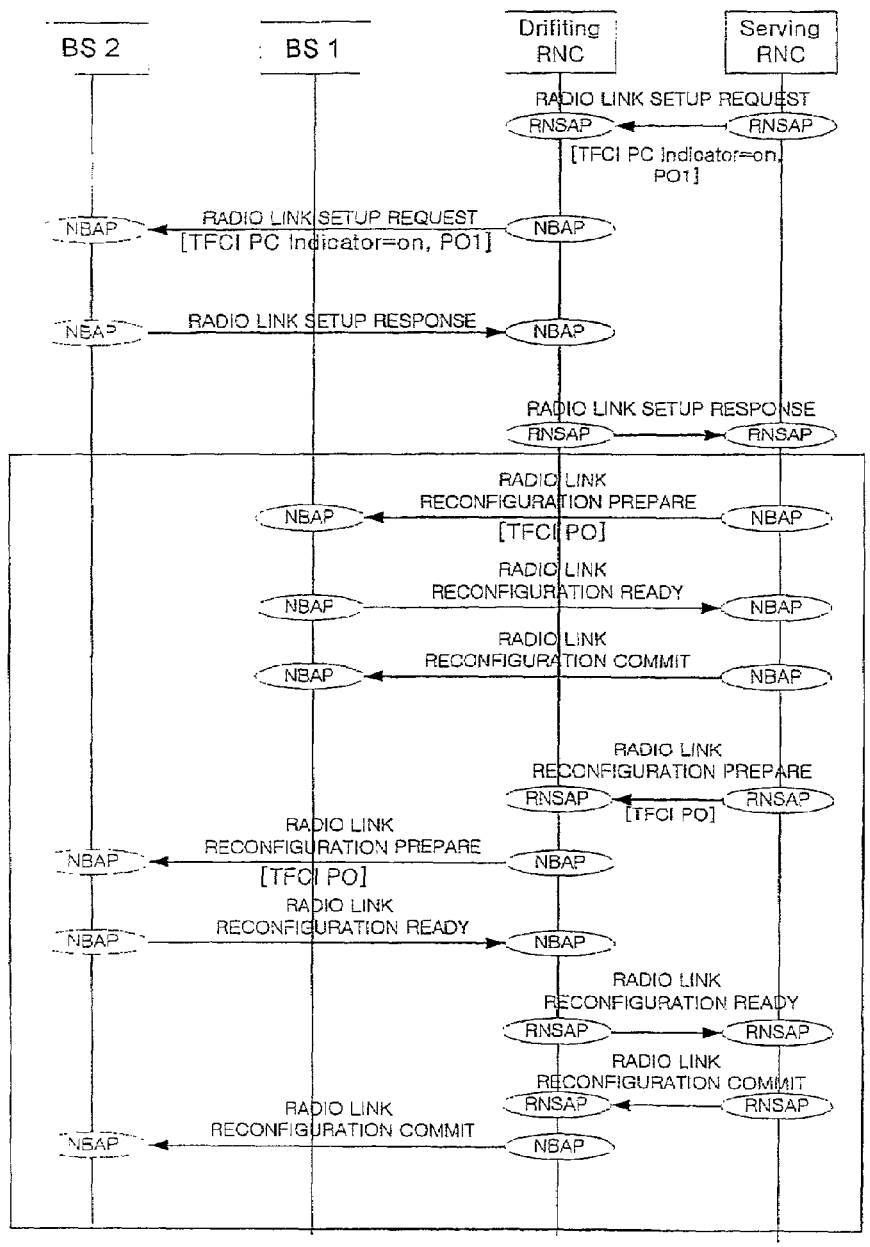
Figure 16C:
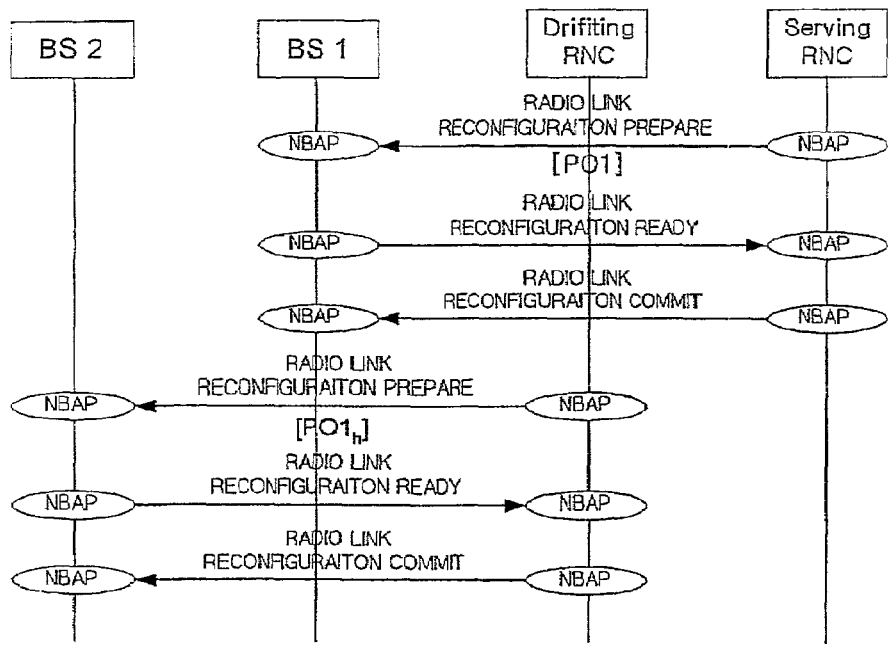
Figure 16D:
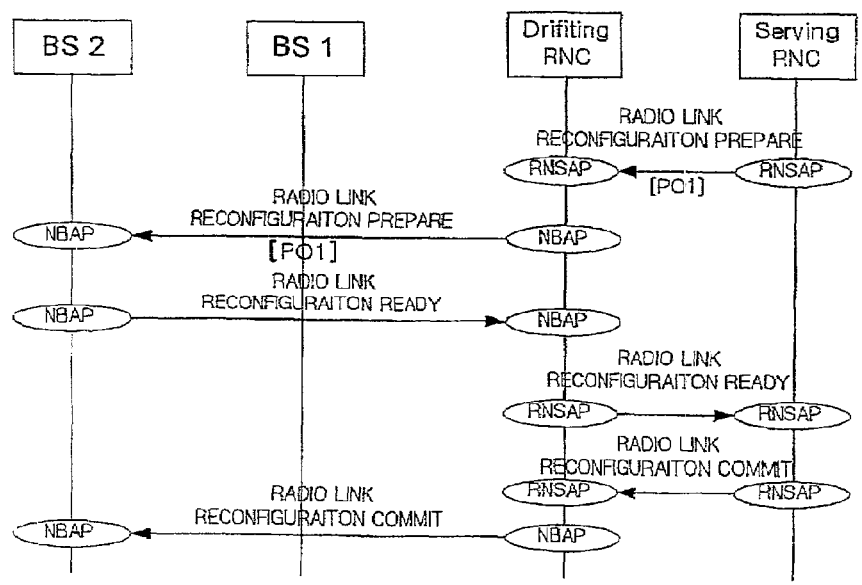

According to the second procedure, a new control frame format is created for informing the TFCI power offset value in the DSCH Hard split mode (see FIG. 13). The TFCI power offset value can be informed using this new control frame in the new control frame.

Figure 12:
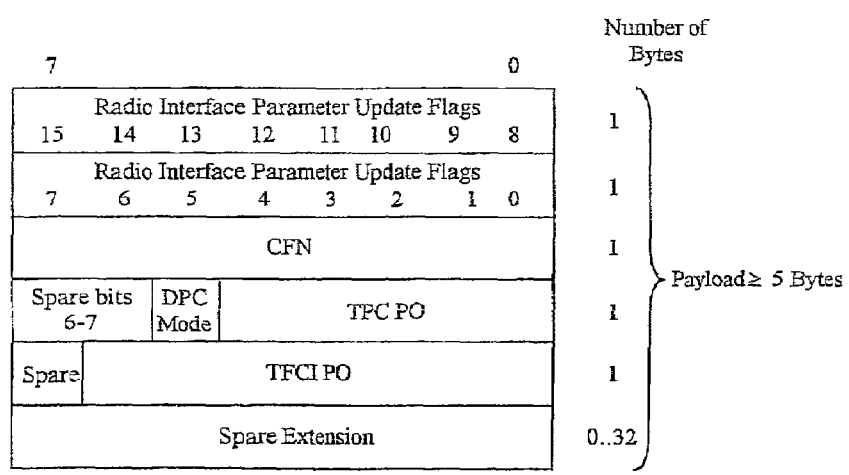
FIG. 12 shows a control frame format for a modified Radio Interface Parameter Update according to a first embodiment of the present invention.

In FIG. 12 and FIG. 13, the length of the field for the TFCI power offset is seven bits, however, the maximum length is eight bits long. In case of using the seven bit TFCI power offset, a range of the offset range can be expanded from 0 to 31.75 dB if the offset's granularity is 0.25 dB.

In more detail, the Radio Interface Parameter Update frame format of FIG. 12 comprises 2 bytes of Radio Interface Parameter Update flags field; 1 byte of CFN field; 1 byte having 5 bits of TPC power offset (TPC PO) field, 1 bit of DPC mode field, and 6–7 bits of spare field, and 1 byte consisting of at least 7 bits of TFCI power offset (TFCI PO) field and spare field, in 5 bytes of frame payload. On the other hand, the Radio Interface Parameter Update frame format of FIG. 13 comprises 1 byte of Enhanced DSCH TFCI power control flags field and 1 byte having at least 7 bits of TFCI power offset (TFCI PO) field, in 2 bytes of frame payload.

To compare the signaling procedures according to the first embodiment of the present invention with the conventional signaling procedure, the procedures will be explained with the situations of FIG. 9a~FIG. 9d where the DSCH-associated DCH soft handover and DSCH hard handover are executed according to the movement of the mobile station.

FIG. 14a to FIG. 14d shows the first signaling procedure of the first method according to the first embodiment of the present invention.

As shown in FIG. 14a to FIG. 14d, the TFCI power offset is informed using the control frame of the user plane (see FIG. 12) when the topology of the active set is changed by addition or deletion of the radio links or the number of the radio links that transmit the TFCI2 are changed. The procedures shown in FIG. 14a~FIG. 14d corresponds to the situations of FIG. 9a~FIG. 9d. A radio link setup is performed between a SRNC and a base station in FIG. 14a, the SRNC transmits the Radio Interface Parameter Update control frames including the TFCI POs to its control base station and the DRNC, and the DRNC transmits the Radio Interface Parameter Update control frames including the TFCI Pos to its control base station after the radio link set up stage in FIG. 14b. The SRNC transmits the Radio Interface Parameter Update control frames including the TFCI POs to its control base station and the DRNC, and the DRNC transmits the Radio Interface Parameter Update control frames including the TFCI POs to its control base station in FIG. 14c. The SRNC transmits the Radio Interface Parameter Update control frames including the TFCI POs to the DRNC, and the DRNC transmits the Radio Interface Parameter Update control frames including the TFCI PO and power information to its control base station in FIG. 14c.

FIG. 15a to FIG. 15d shows the second signaling procedure of the first method according to the first embodiment of the present invention. This procedure is similar to that of FIG. 14a to FIG. 14d except that the Radio Interface Parameter Update control frame is replaced by another control frame called by "DSCH TFCI power control" (see FIG. 13) only for the TFCI power control.

On the other hand, in the second method (Method-1b), an additional parameter is provided to the TFCI power offset value adapted to the DPCCHs that transmit the TFCI2 during the handover of the DSCH associated with the messages used in the NBAP and RNSAP for TFCI power control in the control plane.

FIG. 16a to FIG. 16d shows the signaling procedure of the second method according to the first embodiment of the present invention.

As shown in FIG. 16a to FIG. 16d, the TFCI power offset value (TFCIPO) adapted to the DPCCHs that transmit the TFCI2 during the DCH soft handover is also carried within the Radio Link Reconfiguration Prepare, Radio Link Reconfiguration Ready, and Radio Link Reconfiguration Commit messages of the NBAP or RNSAP according to the status of the radio links, instead of just being informed only during the Radio link setup. In the second method, the R99/R4's general TFCI power offset value can be carried in the corresponding field in case the general TFCI power offset value should be used after the handover.

<Embodiment 2>

This relates to signaling procedure of the TFCI power offset of all the DPCCHs that transmit the TFCI2 according to whether the base station is in the primary or non-primary cell on the basis of the SSDT signaling information during the handover.

FIG. 17a to FIG. 17e are block diagrams for Illustrating a DSCH-associated DCH soft handover and a DSCH hard handover according to the movement of the mobile station.

Figure 17A:
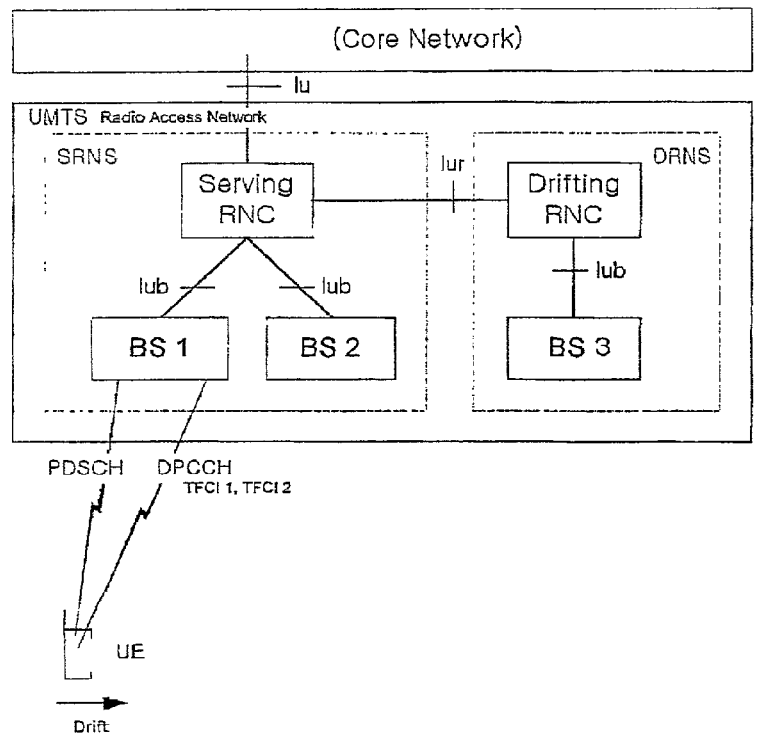
FIG. 17a to FIG. 17e are block diagrams for illustrating a DSCH-associated DCH soft handover and a DSCH hard handover according to the movement of the mobile station.
Figure 17B:
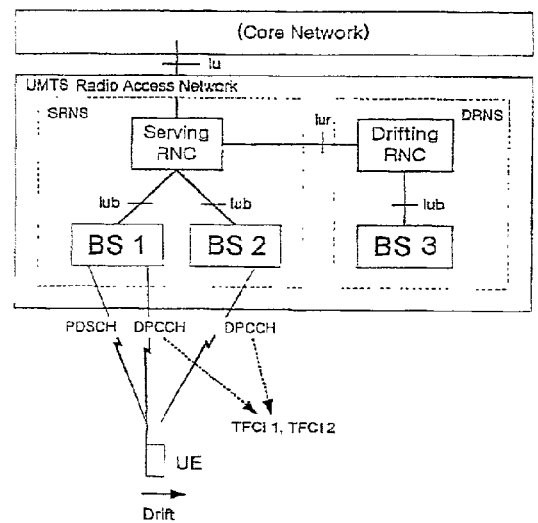

FIG. 17a shows a situation before the DSCH-associated DCH soft handover is performed and FIG. 17b shows a situation during the DSCH-associated DCH soft handover between the RNCs and before the DSCH hard handover is performed. And also, FIG. 17c shows a situation while both the DSCH hard handover and the DCH soft handover are performed between the RNCs, FIG. 17d shows a situation during the DSCH hard handover between the RNCs, and FIG. 17e shows a situation after the DSCH-associated DCH soft handover ends.

Figure 17C:
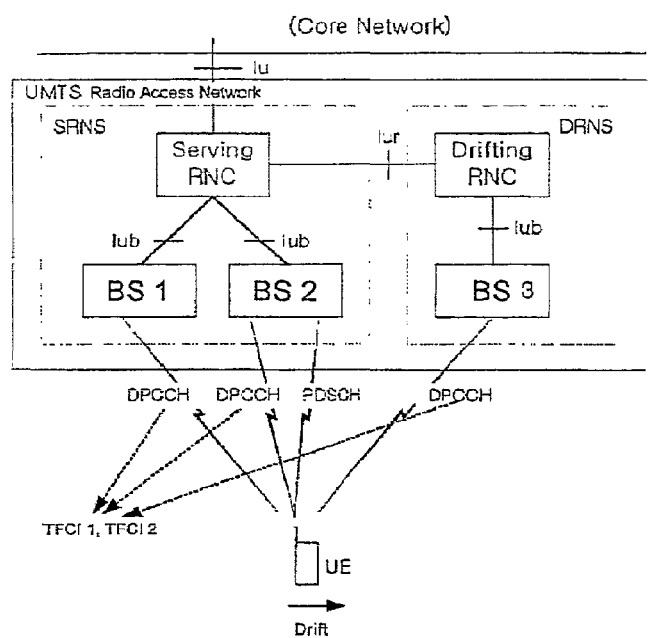
Figure 17D:
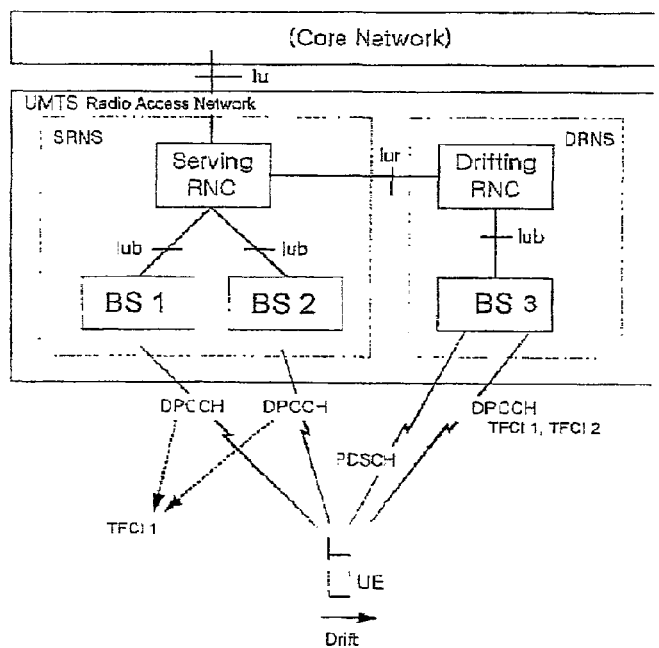
Figure 17E:
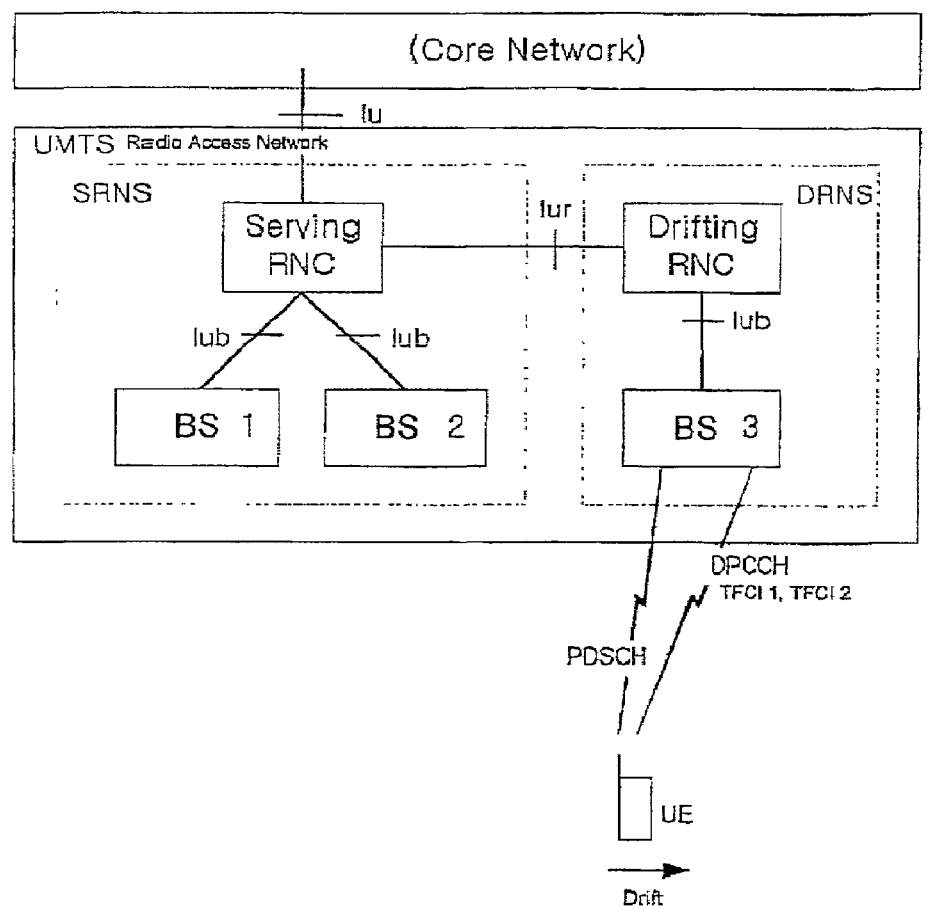
Figure 18A:
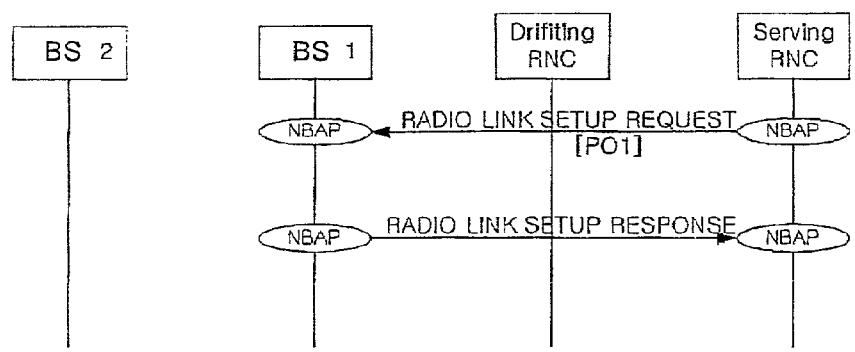
FIG. 18a and FIG. 18b are drawings for illustrating conventional signaling procedures in the states of FIG. 9a and FIG. 9b.
Figure 18B:
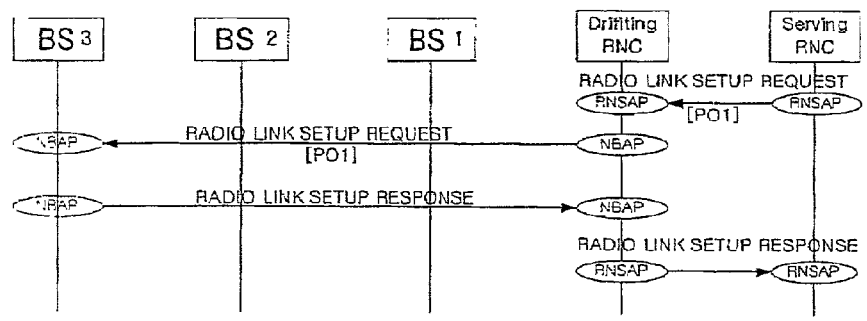

FIG. 18a and FIG. 18b shows a conventional signaling procedure in the situations of FIG. 17a to FIG. 17c. As shown in FIG. 18a and FIG. 18b, there is no separate TFCI power offset signaling for the DPCCH belonged to the primary cell among the DPCCHs that transmit the TFCI2 and the DPCCH belonged to the non-primary cell among the DPCCHs that transmit the TFCI2 during the associated DCH soft handover, even though SSDT-support equipments are used. Since the TFCI power offset information is transmitted only when the radio link is set up, it is transmitted only in the situations of FIG. 17a and FIG. 17c such that it is impossible to set an appropriate TFCI power offset value according to the movement of the mobile station or the number of the radio links which transmit the TFCI2.

In the first method (Method-2a) of the second embodiment, a control frame having a newly created field for containing information about the TFCI power offsets adapted to the DPCCH belonged to the primary cell among the DPCCHs that transmit the TFCI2 value during the associated DCH soft handover for the TFCI power control and adapted to the DPCCH belonged to the non-primary cell among the DPCCHs that transmit TFCI2 value during the associated DCH soft handover. This first method of the second embodiment is similar to the first method of the first embodiment. However, since the control information to be added and the situations requiring the information differ from those of the first method of the first embodiment, the procedure or format of the control frame also must be modified. To carry the TFCI power offset value, new fields for TFCI power control is added to the Radio Interface Parameter Update control frame of FIG. 7 as the first procedure, or another control frame for the TFCI power control can be created in the DSCH hard split mode as the second procedure. In these cases, the required information are about the TFCI power offset (TFCI PO_primary) value adapted for the DPCCHs belonged to the primary cell among the DPCCHs that transmit the TFCI2 and the TFCI power offset (TFCI PO_non-primary) value adapted to the DPCCH belonged to the non-primary cell among the DPCCHs that transmit the associated DCH soft handover. These values are used in different situations according to the change of the link configuration by the handover. The TFCI power offset value should be updated by recalculation according the newly suggested method when the number of the links in the active set or the number of the links for transmitting the TFCI2. Now the method can be explained in two respective procedures.

Figure 19:
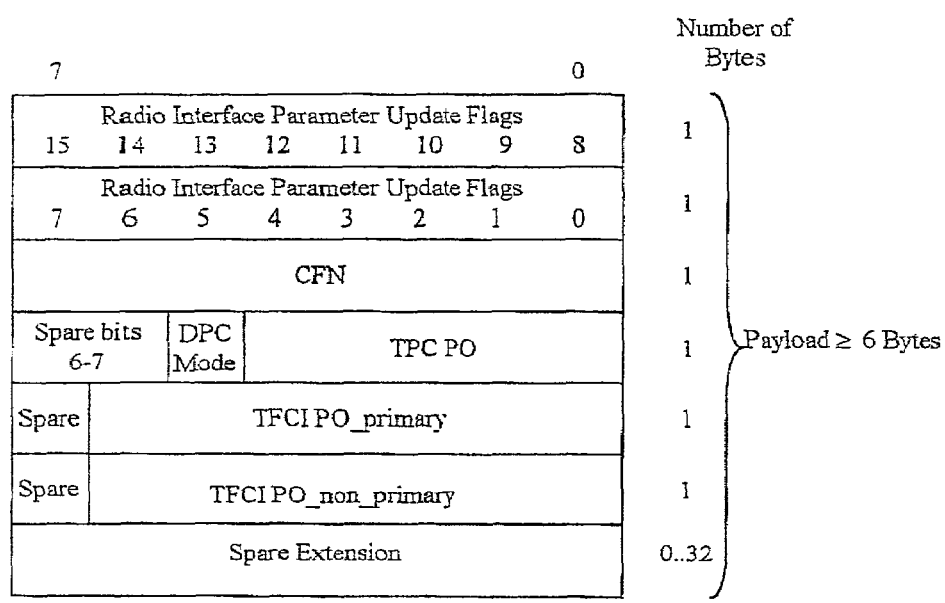
FIG. 19 shows a control frame format for a modified Radio Interface Parameter Update according to a second embodiment of the present invention.

FIG. 19 shows the control frame format for a modified Radio Interface Parameter Update according to the first procedure. In FIG. 19, the third bit of the Radio interface Parameter Update flags indicates whether or not the TFCI PO value is contained in the fifth byte, the fourth bit indicates whether or not the TFCI PO_primary is contained in the sixth byte, and the fifth bit indicates whether or not the TFCI PO_non_primary is contained in the seventh byte.

Figure 20:
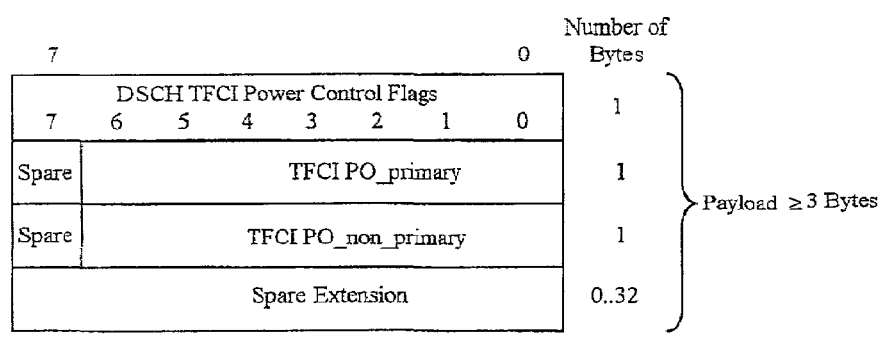
FIG. 20 shows a newly added control frame format for a DSCH TFCI power control according to the second embodiment of the present invention.
Figure 21A:
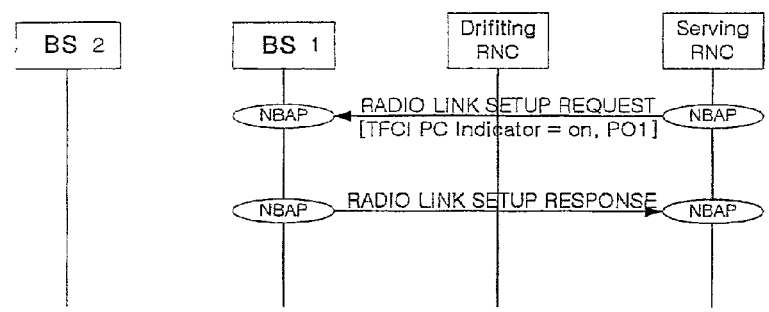
FIG. 21a to FIG. 21e are drawings for illustrating a signaling procedure according to the second embodiment of the present invention.
Figure 21B:
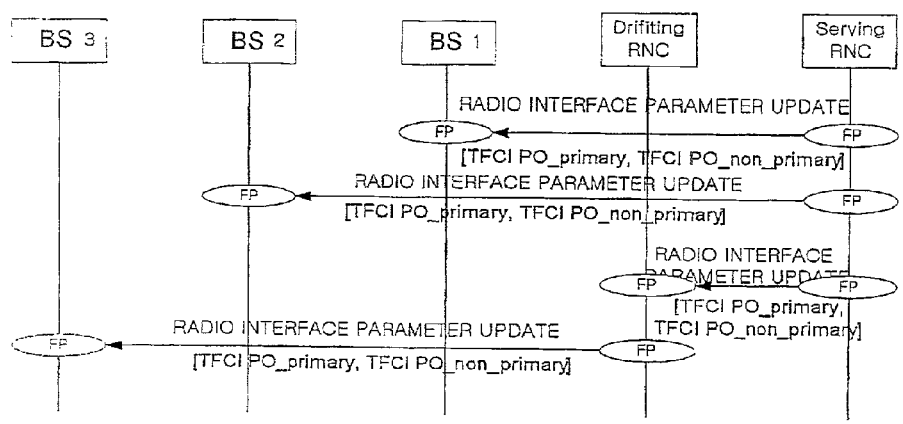
Figure 21C:
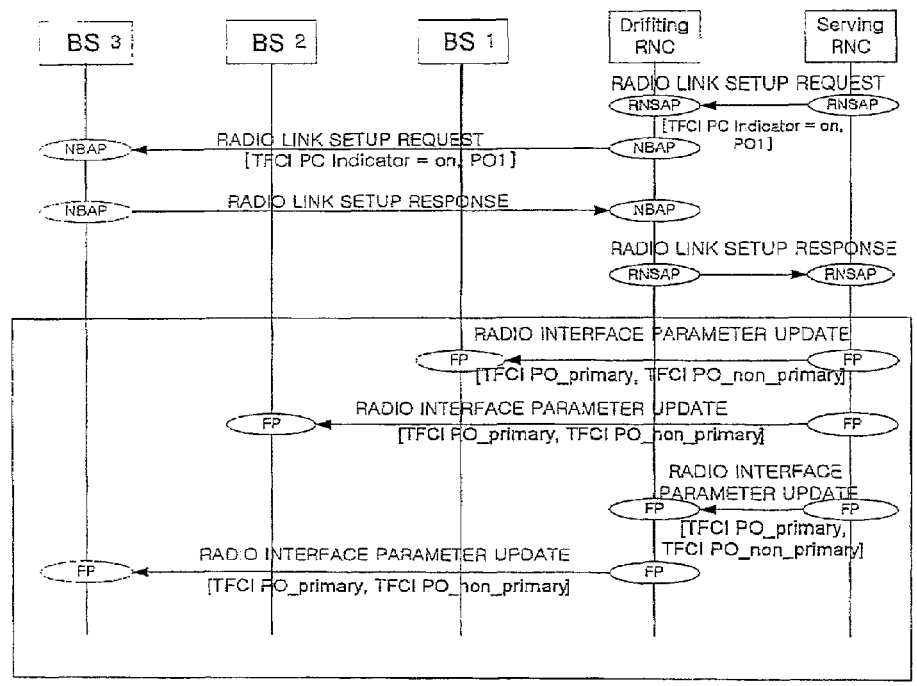
Figure 21D:
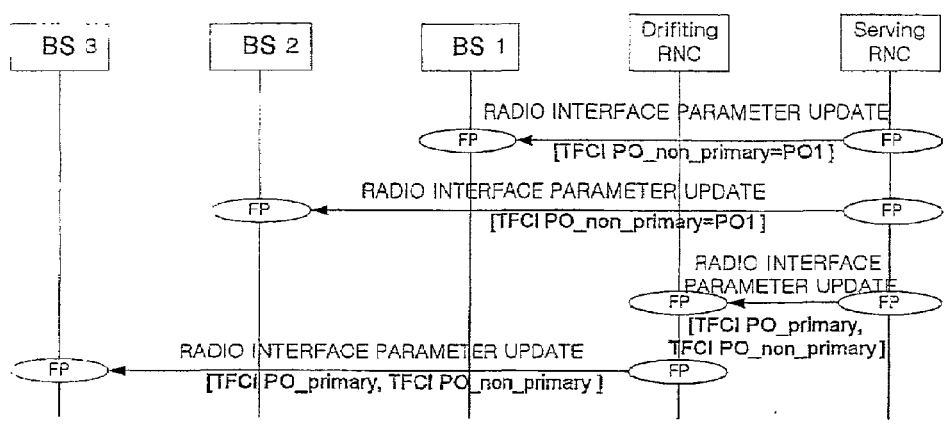
Figure 21E:
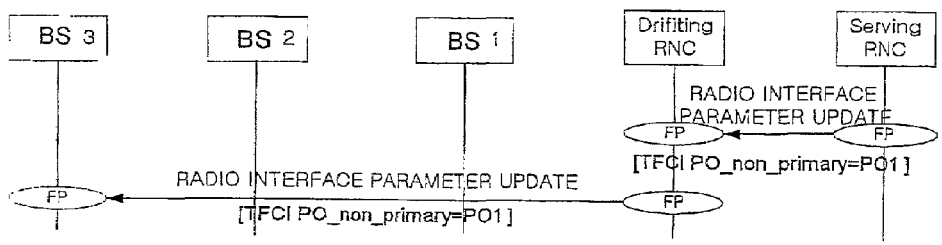
Figure 22A:
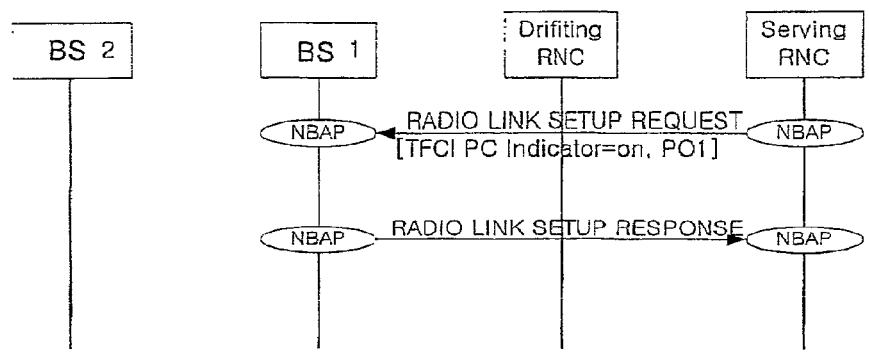
FIG. 22a to FIG. 22e are drawings for illustrating another signaling procedure according to the second embodiment of the present invention.
Figure 22B:
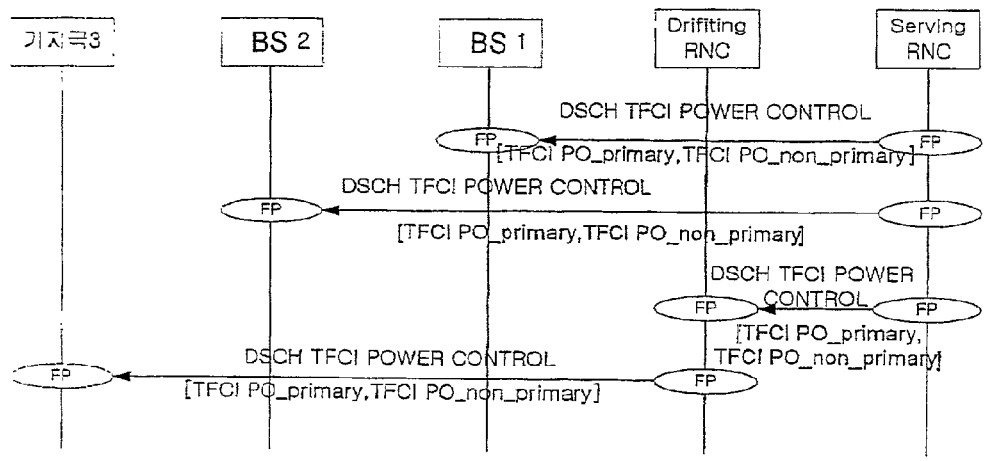
Figure 22C:
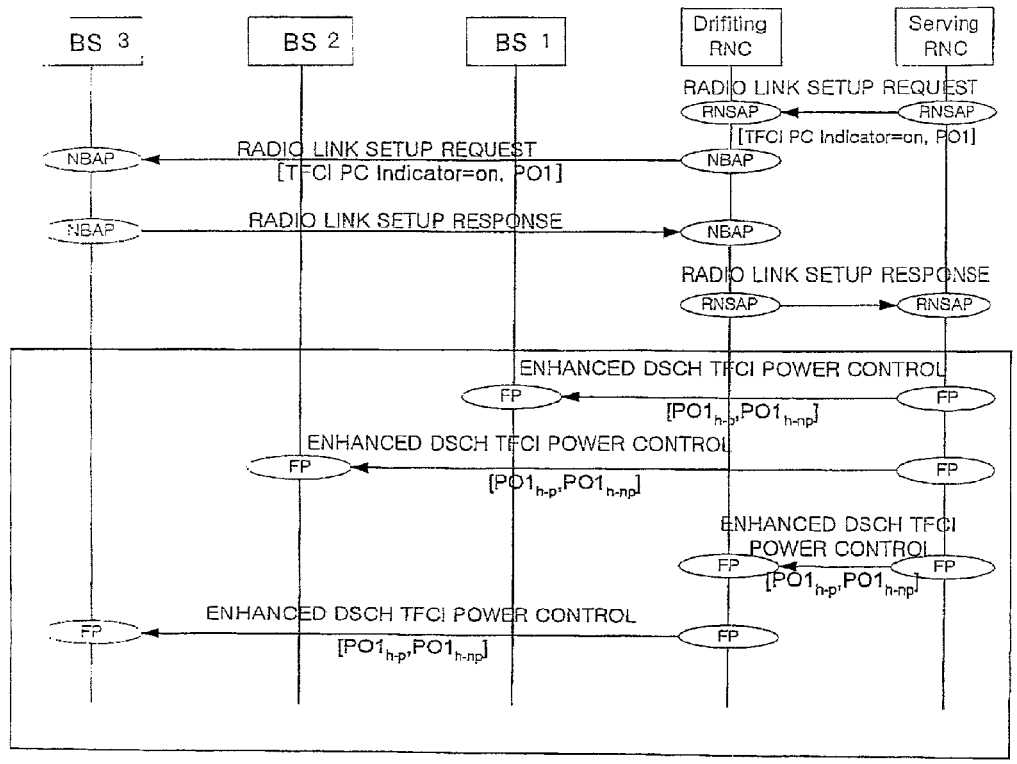
Figure 22D:
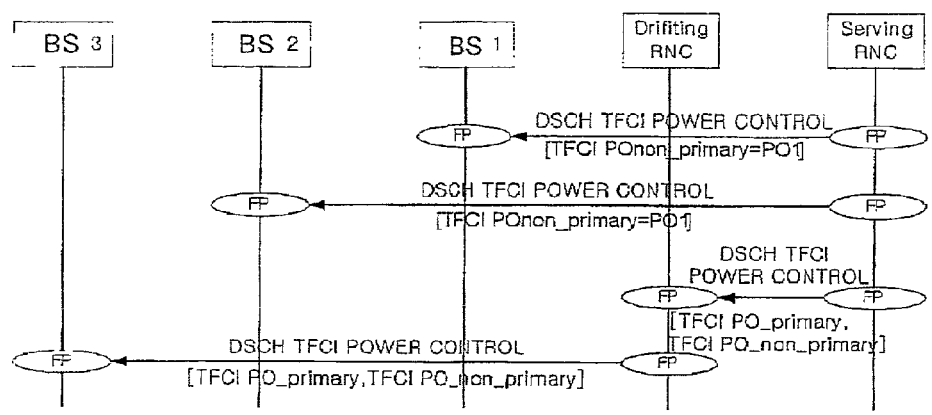
Figure 22E:
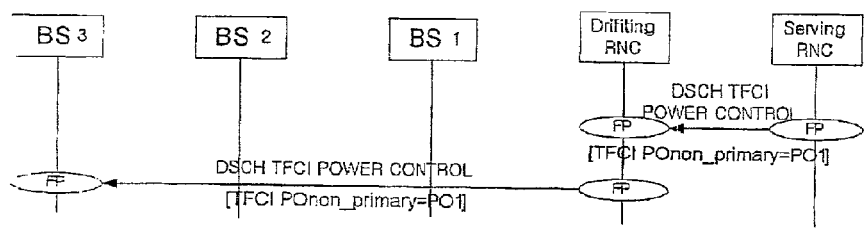
Figure 23A:
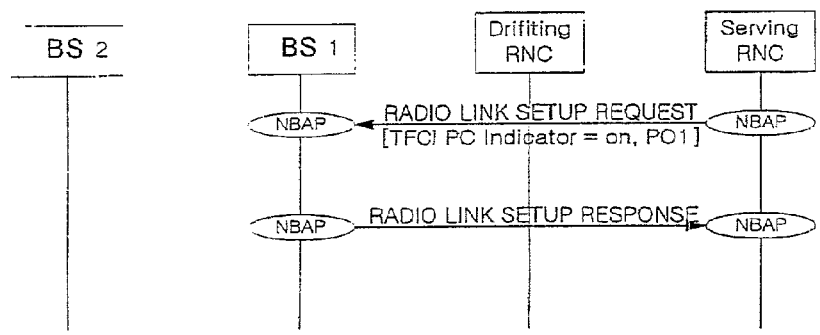
FIG. 23a to FIG. 23e are drawings for illustrating another signaling procedure according to the second embodiment of the present invention.
Figure 23B:
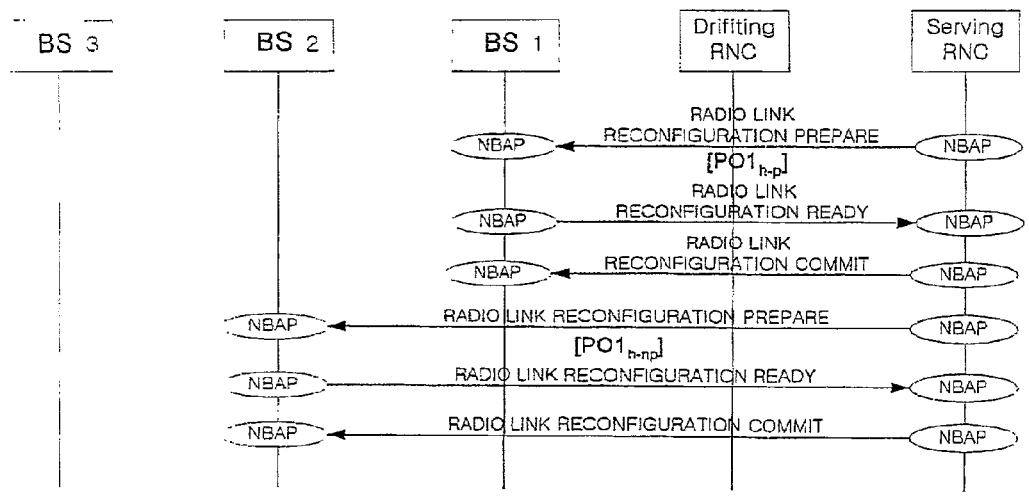
Figure 23C:
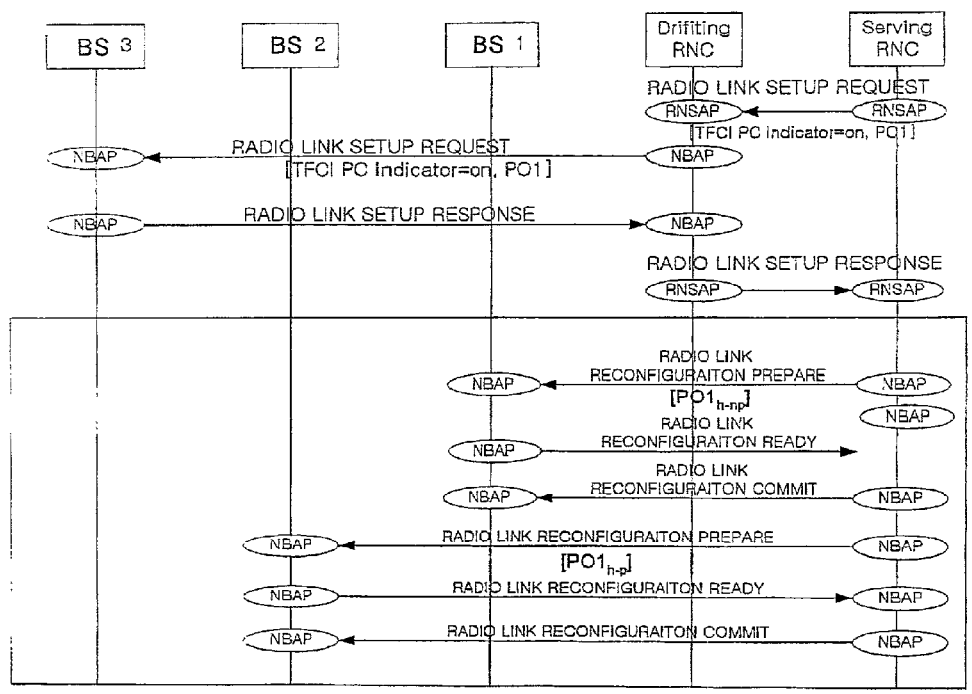
Figure 23D:
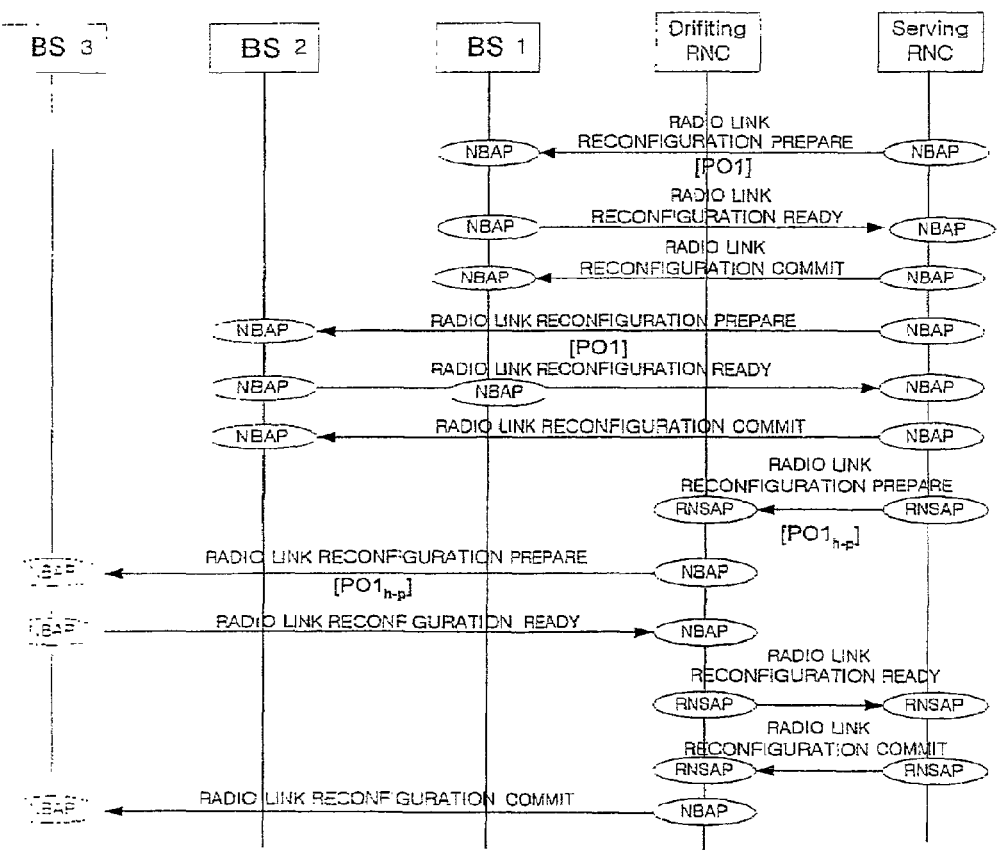
Figure 23E:
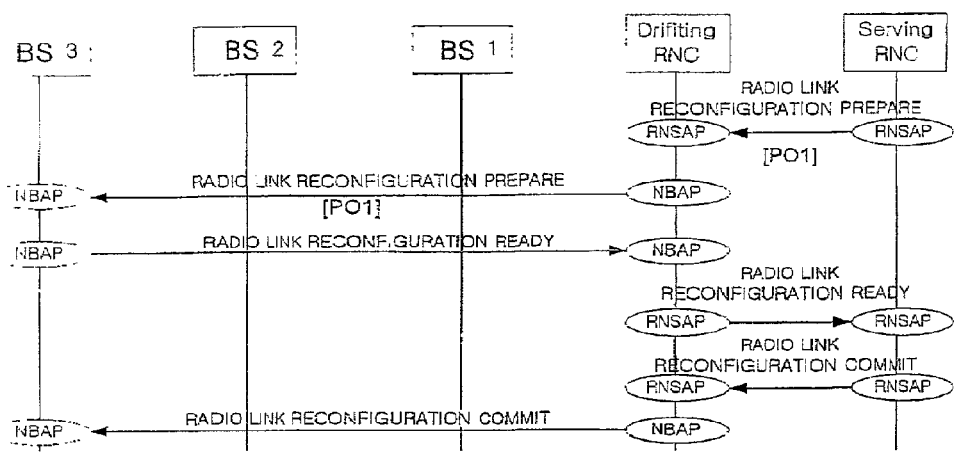
Figure 26A:
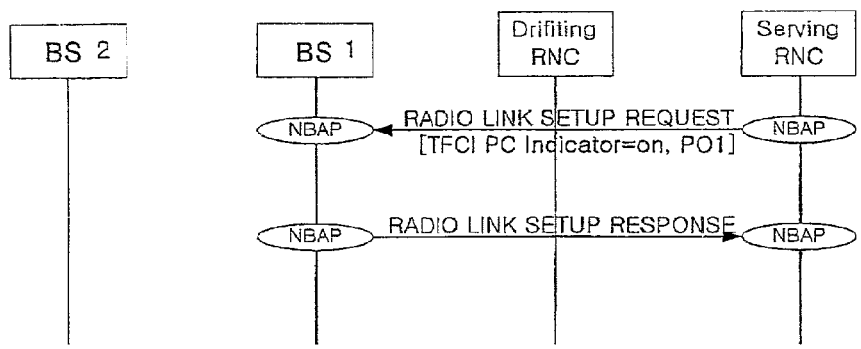
FIG 26a to FIG. 26e are drawings for illustrating a signaling procedure according to the third embodiment of the present invention.
Figure 26B:
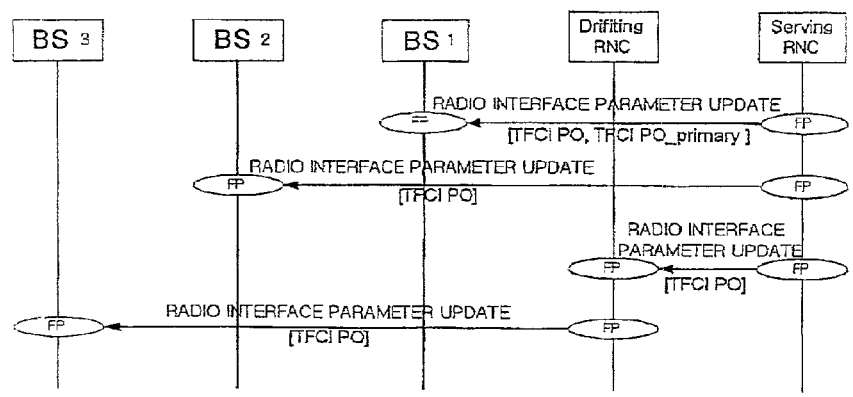
Figure 26C:
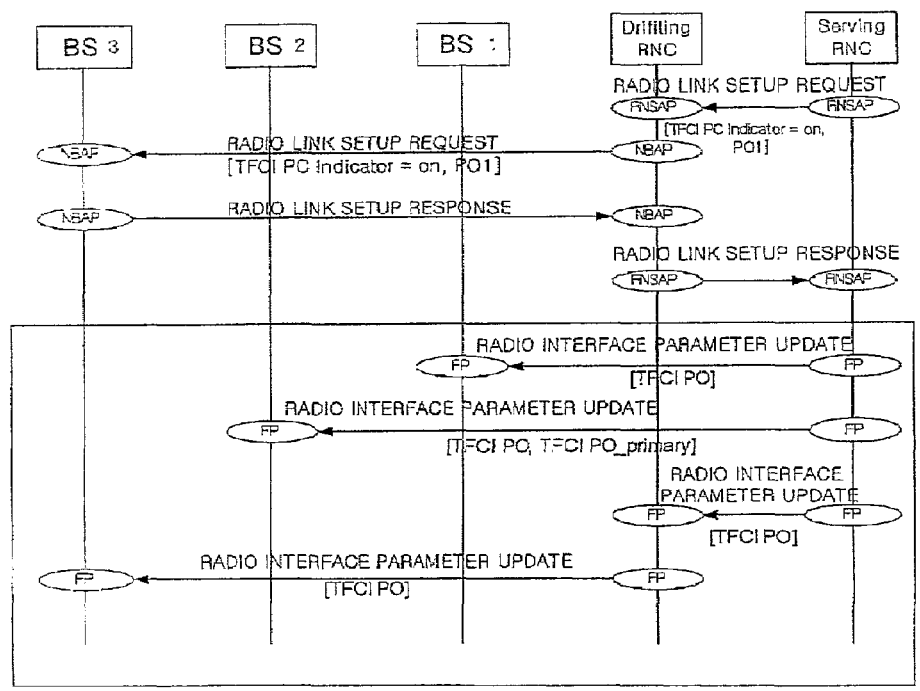
Figure 26D:
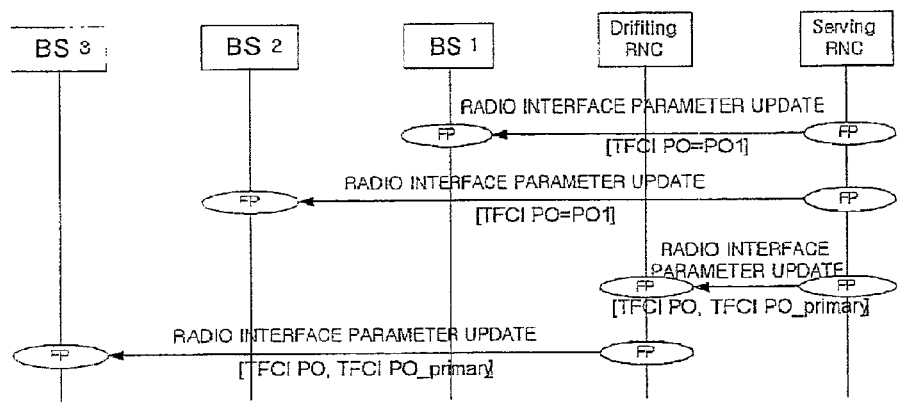
Figure 26E:
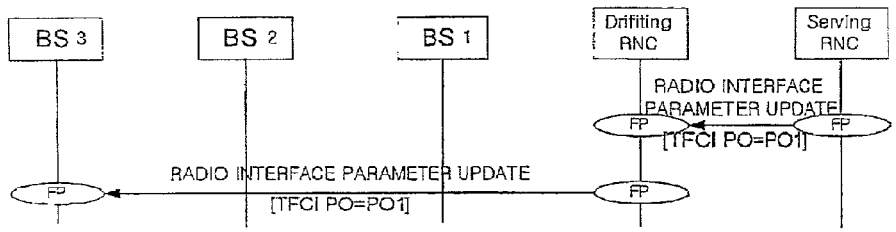
Figure 27A:
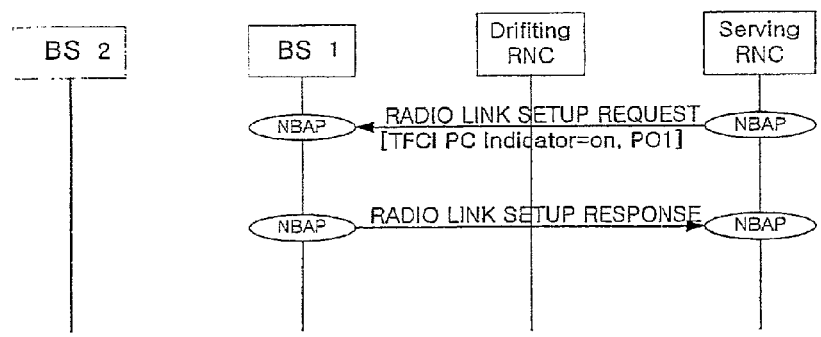
FIG. 27a to FIG. 27e are drawings for illustrating another signaling procedure according to the third embodiment of the present invention.
Figure 27B:
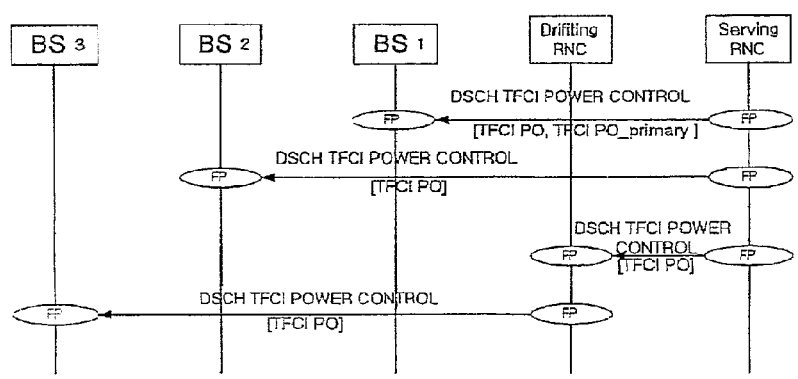
Figure 27C:
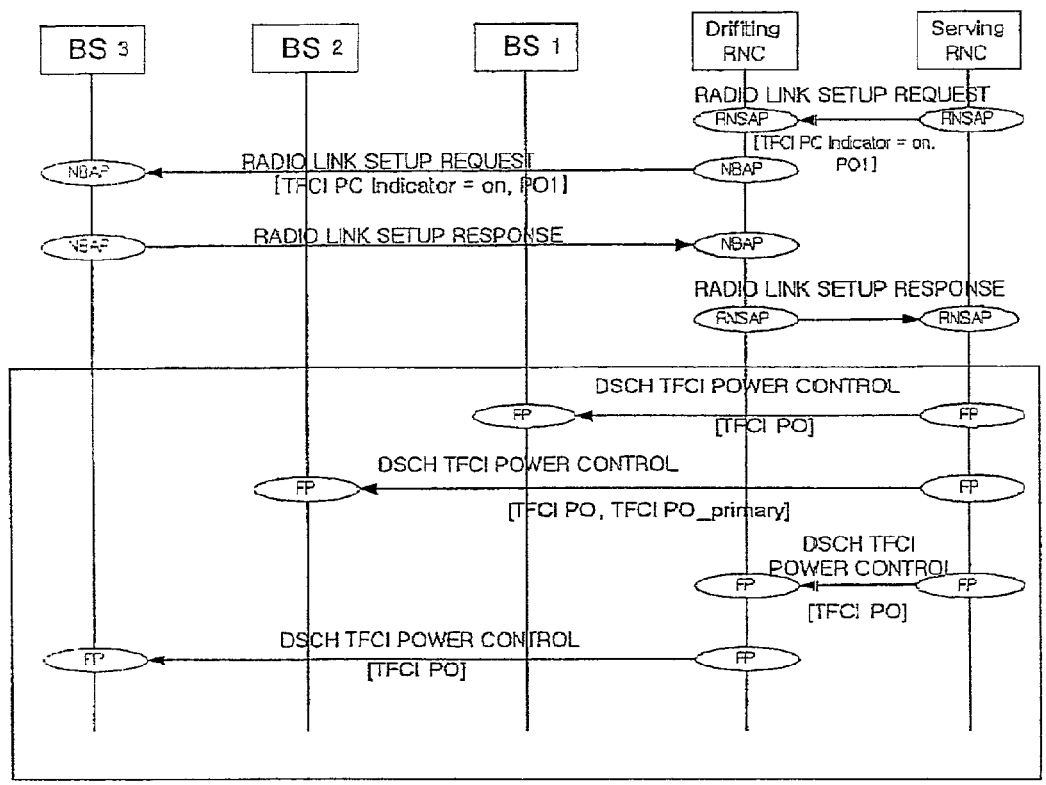
Figure 27D:
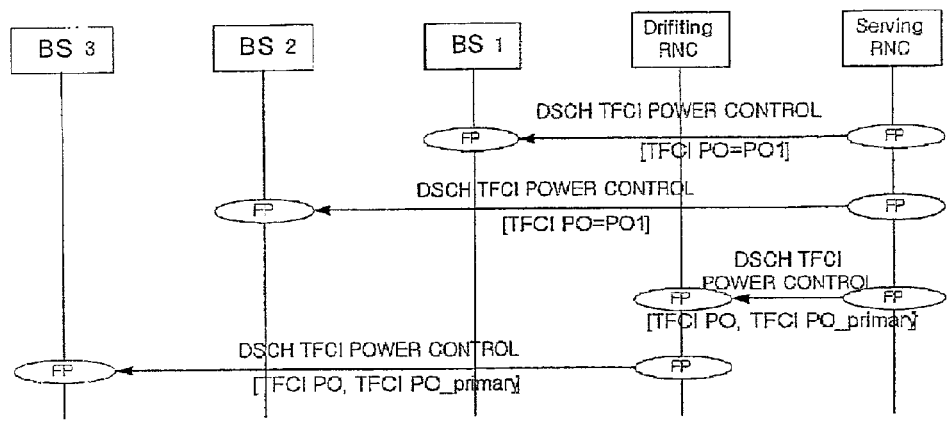
Figure 27E:
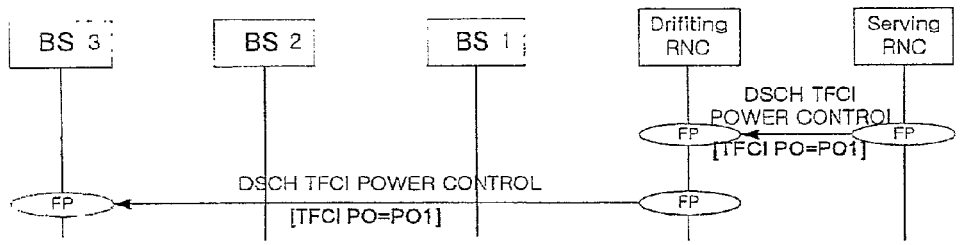
Figure 28A:
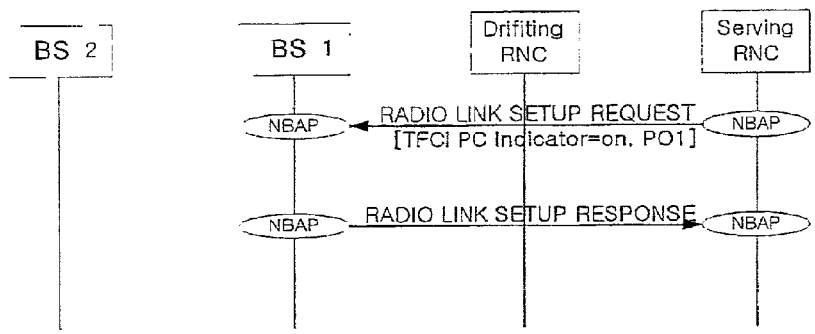
FIG. 28a to FIG. 28e are drawings for illustrating another signaling procedure according to the third embodiment of the present invention.
Figure 28B:
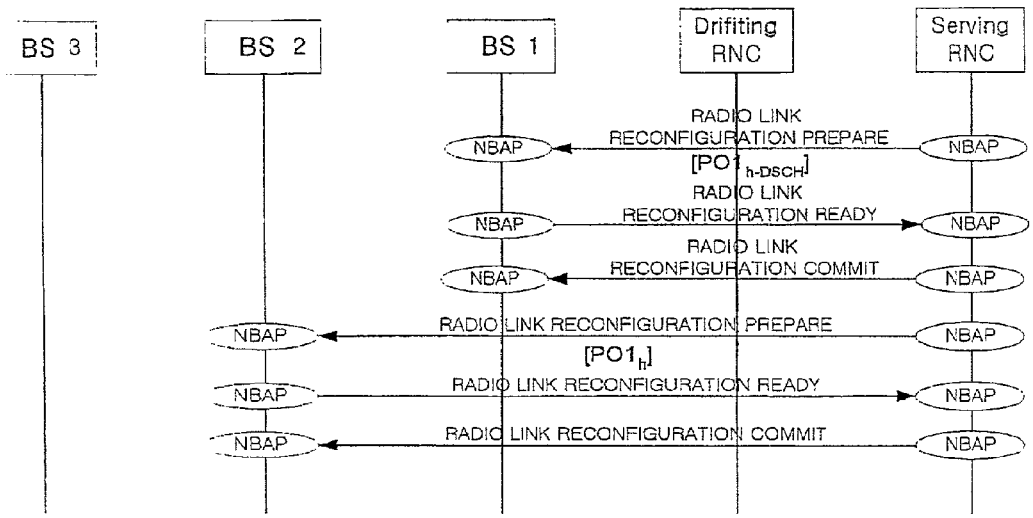
Figure 28C:
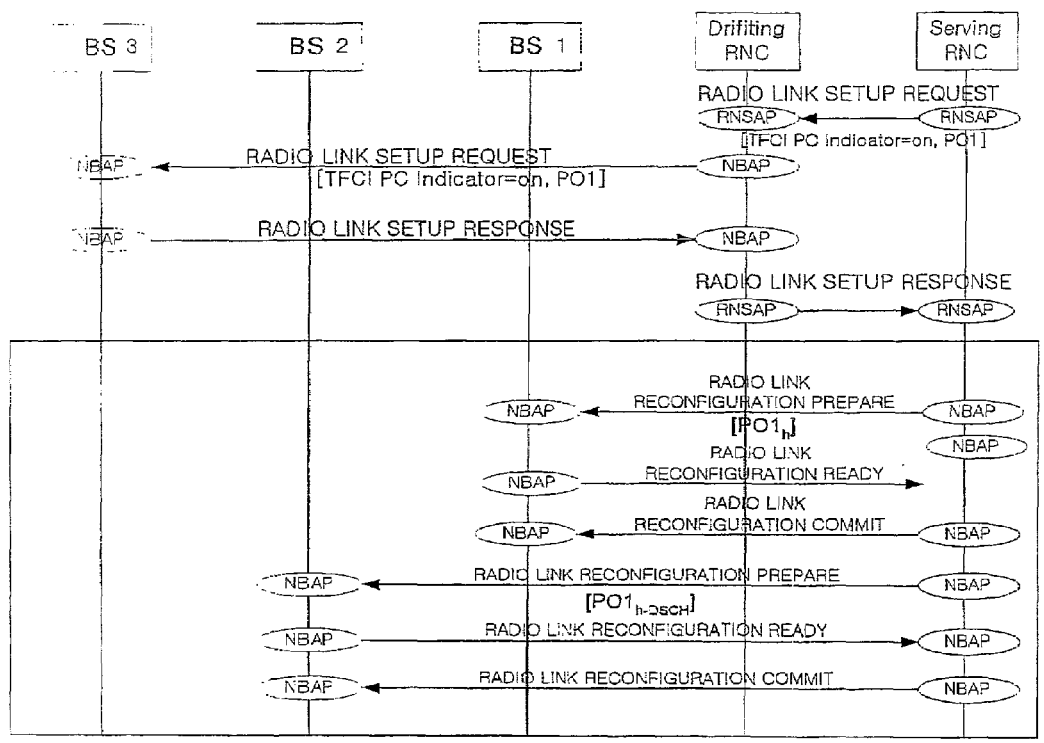
Figure 28D:
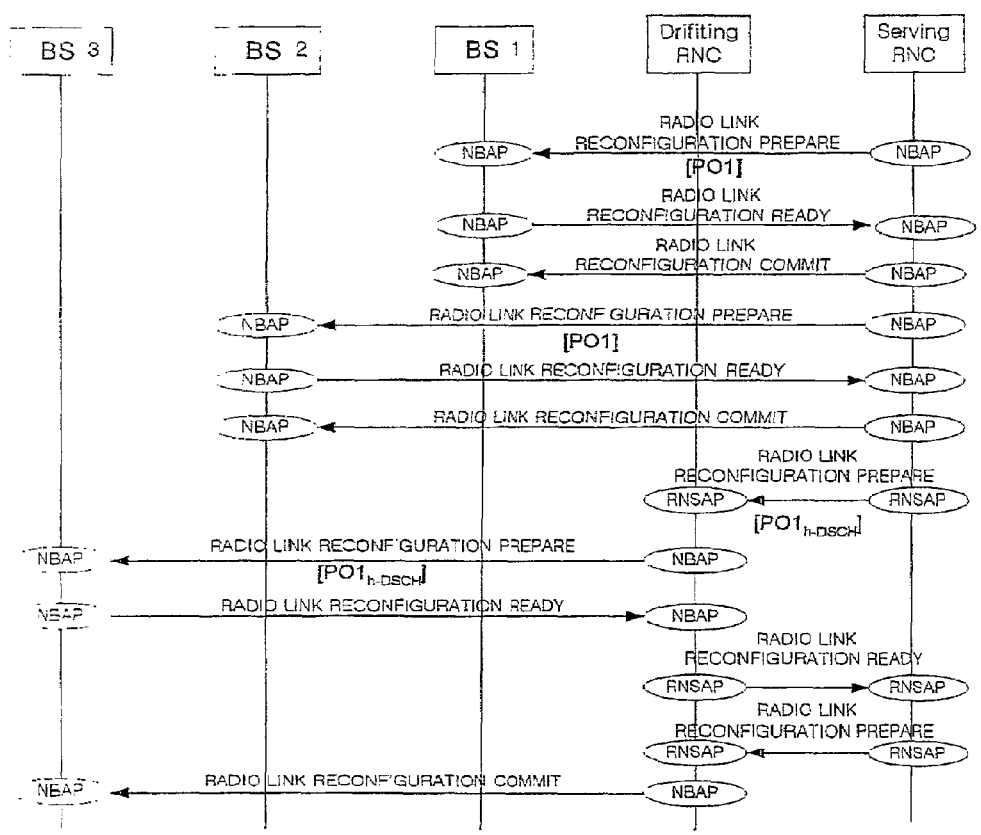
Figure 28E:
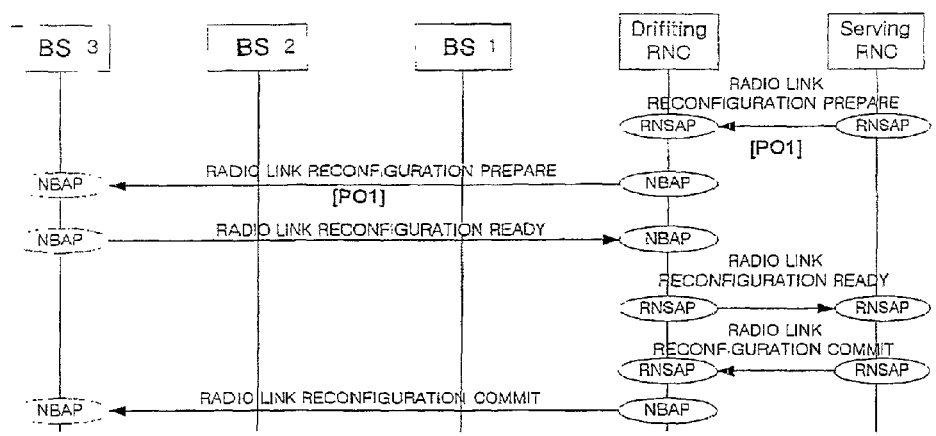

FIG. 20 shows the control frame format newly created for indicating the TFCI power offset in the DSCH hard split mode according to the second procedure. The TFCI power offset value can be shown using the new control frame in the DSCH hard split mode. As shown FIG. 20, the control frame format comprises 1 byte of DSCH TFCI power control flags field, 1 byte having at least 7 bits of TFCI power offset (TFCI PO_primary) field adapted to the DPCCH belonged to the primary cell among the DPCCHs that transmit the TFCI2 value during the associated DCH soft handover and a TFCI power offset (TFCI PO_non_primary) field adapted to the DPCCH belonged to the non-primary cell among the DPCCHs that transmit the TFCI2 during the associated DCH soft handover, in 4 bytes of the frame payload.

In FIG. 19 and FIG. 20, even though the length of the TFCI power offset field is 7 bits, however, the maximum length is 8 bits long, in case of using the 7 bit TFCI power offsets a range of the offset range can be expanded from 0 to 31.75 dB if the offset's granularity is 0.25 dB.

FIG. 21a to FIG. 21e shows the first signaling procedure of the first method according to the second embodiment of the present invention in the situations of FIG. 17a~FIG. 17e. In FIG. 18a and FIG. 18b, the TFCI power offset informed using the NBAP and RNSAP messages of the control plane in the radio link setup is used regardless of the movement of the mobile station (UE) or the change of the number of radio links. Also, to transmit the TFIC power offset between the RNC and the base station or between RNCs, only the NBAP and RNSAP messages are used. That is, there is no method for informing the TFCI power offset to the control frame of the user plane. Otherwise, in FIG. 21*b* to FIG. 21*e*, appropriate TFCI power offset can be informed using the control frame (see FIG. 19) of the user plane when the topology of the active set is changed by addition or deletion of the radio links or the number of the radio links that transmit the TFCI2 is changed.

FIG. 22*a* to FIG. 22*e* shows the second signaling procedure of the first method according to the second embodiment of the present invention in the situations of FIG. 17*a*~FIG. 17*e*. In this case, the Radio Interface Parameter Update control frame is replaced by a control frame called by "DSCH TFCI Power Control" (see FIG. 20) only for the TFCI power control.

In the second method (Method-2b) of the second embodiment, an additional parameter for the TFCI power offset values adapted to the DPCCH belonged to the primary cell among the DPCCH that transmit the TFCI2 value and the DPCCH belonged to the non-primary cell among the DPCCH that transmit the TFCI2 the associated DCH soft handover. In this method, the R99/R4's general TFIC power offset value can be carried in the corresponding field when the general TFCI power offset should be used after the handover.

FIG. 23*a* to FIG. 23*e* shows the signaling procedure for adjusting the TFCI power offset using the second method of the second embodiment in situations of the FIG. 17*a*~FIG. 17*e*.

As shown in FIG. 23*a* to FIG. 23*e*, the TFCI power offset value (TFCI PO_primary) of the DPPCH belonged to the primary cell among the DPCCHs that transmit the TFCI2 and the TFCI power offset (TFCI PO_non_primary) for the DPCCH belonged to the non-primary among the DPCCHs that transmit the TFCI2 during the associated DHC soft handover are carried in the Radio Link Reconfiguration Prepare, Radio Link Reconfiguration Ready, and Radio Link Reconfiguration Commit messages of the NBAP or RNSAP according to the status of the radio links, but being informed only at the Radio link setup. In this case, the R99/R4's general TFCI power offset value can be carried in the corresponding field when the general TFCI power offset value should be used after the handover.

<Embodiment 3>

This relates to signaling procedure informing the TFCI power offset of DPCCHs in the cell that transmit Uplink SSDT information during the handover based on whether the cell is primary or non-primary.

Referring to FIGS. 18*a* and 18*b*, the conventional signaling procedure does not have different signals for informing the TFCI power offset corresponding to whether the base station that transmits the DSCH is primary or non-primary, although equipment supporting the SSDT is used.

The TFCI power offset information is transmitted only in the radio link setup in the FIG. 18*a* and FIG. 18*b* corresponding to the FIG. 17*a* and FIG. 17*c* when the conventional power control scheme is used. Accordingly, it is impossible to set an appropriate TFCI power offset when the cell is changed from the primary to non-primary one and vice versa according to the change of status of the radio links in the conventional procedure.

In the first method (Method-3*a*), when the associated DCH soft handover is performed for the TFCI power control in the user plane, a new type of control frame to which a new field is added for carrying the TFCI power offset value adapted if the cell, which transmit the DSCH, among the DPCCHs of the cells that transmit the TFCI2 is the primary cell, and the information about the cells of the TFCI power offset value adapted in case that the cell, which does not transmit the DSCH, among the DPCCHs of the cells which transmit the TFCI2 is non-primary cell. The first method is similar to the first method of the second embodiment. However, the information to be added and the situations requiring this information differ from the first method of the second embodiment such that the procedure and control frame format also is modified.

To carry the power offset value, new fields for the TFCI power control can be added to the conventional Radio Interface Parameter Update frame of FIG. 7 as the first procedure, or another control frame for the TFCI power control can be created in the DSCH hard split mode as the second procedure. in these cases, it is required to obtain the information about the TFCI power offset TFCI PO_primary) value adapted when the cell which transmits the DSHC is the primary cell among the DPCCHs in the cells that transmit the TFCI2 value during the associated DCH soft handover, and the TFCI power (TFCI PO_non_primary) value adapted in case that the cell that transmits the DSCH among the DPCCHs of the cells that transmit the TFCI2 value is non-primary during the associated DCH soft handover. These values are used in different situations according to the change of the link by the handover. That is, the values should be updated according to the suggested method by recalculation in case where the number of the links changes in the active set or the number of the links changes for transmitting the TFCI2. In the third embodiment, the R99/R4's general TFCI power offset value can be carried in the corresponding field when the general TFCI power offset value should be used after the handover.

According to the first procedure, a Radio Interface Parameter Update control frame format (FIG. 24) modified from the conventional one is used. In this frame format, the third bit of Radio Interface Parameter Update flags field indicates whether or not the TFCI PO value exists in the fifth byte, and the fourth bit indicates whether or not the TFCI PO_primary exists in the sixth byte.

As shown in FIG. 24, the Radio Interface Parameter Update control frame format comprises 2 bytes of Radio Interface Parameter Update flags field, 1 byte of CFN information field, 1 byte of TPC power offset and DPC mode fields, at least 7 bits of the TFGI PO field, and at least 7 bits of the TFCI PO_primary field, in 6 bytes of payload. In this case, the value of the TFCI PO field can be the TFCI power offset value adapted to the DPCCH belonged to the non-primary cell among the DPCCHs that transmit the TFCI2 value during the associated DCH soft handover.

According to the second procedure, a new control frame format created for informing the TFCI power offset value in the DSCH Hard split mode (see FIG. 25). The TFCI power offset value can be informed using this new control frame in the new control frame.

As shown in FIG. 25, the control frame format comprises 1 byte of the DSCH TFCI power control flags field, at least 7 bits of the TFCI PO field, and at least 7 bits of TFCI PO_primary field, in 3 bytes of payload.

In FIG. 24 and FIG. 25, the length of the field for the TFCI power offset is 7 bits, however, the maximum length is 8 bits long. In case of using the 7 bit TFCI power offset of FIG. 12, a range of the offset can be expanded from 0 to 31.75 dB if the offset's granularity is 0.25 dB.

FIG. 26a to FIG. 26e show the first signaling procedures of the first method according to the third embodiment of the present invention in the situation of the FIG. 17a to FIG. 17e. In FIG. 18a and FIG. 18b, the TFCI power offset informed using the NBAP and RNSAP messages of the control plane in the radio link setup is used regardless of the movement of the mobile station (UE) or the change of the number of radio links. Also, to transmit the TFCI power offset between the RNC and the base station or between RNCs, only the NBAP and RNSAP messages are used. That is, there is no method for informing the TFCI power offset in the control frame of the user plane. Otherwise, in FIG. 26a to FIG. 26e, appropriate TFCI power offset can be informed using the control frame (see FIG. 24) of the user plane when the topology of the active set is changed by addition or deletion of the radio links or the number of the radio links that transmit the TFCI2 is changed.

FIG. 27a to FIG. 27e shows the second signaling procedure of the first method according to the third embodiment of the present invention in the situation of FIG. 17a to FIG. 17e. In this case, the Radio Interface Parameter Update control frame is replaced by a control frame called by "DSCH TFCI Power Control" (see FIG. 25) only for the TFCI power control.

In the second method (Method-3b) of the third embodiment, an additional parameters for the R99/R4's general TFCI power offset value, the TFCI power offset value (this value varies based on whether the cell is primary or non-primary) adapted to the cell that transmit the DSCH among the DPCCH of the cells which transmits TFCI2 and the TFCI power offset values adapted to the cells that do not transmit the DSCH among the DPCCHs that transmit the TFCI2 during the associated DCH soft handover are add to the messages used the NBAP and RNSAP for TFCI power control in the control plane.

FIG. 28 shows the signaling procedure for adjusting the TFCI power offset for supporting the second method of the third embodiment in the situations of the FIG. 17a to FIG. 17e.

Referring to FIG. 28, the TFCI Power offset is not only provided during the Radio Link, but also through the Radio Link Reconfiguration Prepare, Radio Link Reconfiguration Ready, and Radio Link Reconfiguration Commit messages of the NBAP or RNSAP depending on the status of the radio links. The TFCI power offset value (TFCI PO) typically adapted for DCH, and the TFCI power offset value (TFCI PO_primary) adapted when the cell Which transmits the DSCH among the DPCCHs of the cells that transmit the TFCI2 value during the associated DCH's soft handover is the primary cell are also added to the above-mentioned messages. Moreover, the TFCI power offset value (TFCI PO_non_primary) of the DPCCH transmitted by the base station that transmits the TFCI2 but the DSCH and the base station belonged to the non-primary cell that transmits the DSCH among the DPCCHs of the cells which transmit the TFCI2 during the associated DCH's soft handover is also carried in the Radio Link Reconfiguration Prepare, Radio Link Reconfiguration Ready, and Radio Link Reconfiguration Commit messages of the NBAP or RNSAP according to the status of the radio links.

Also, it is possible to transmit the parameters required in the first and second embodiments by carrying them in one frame format in the user plane (fourth embodiment).

Figure 29:
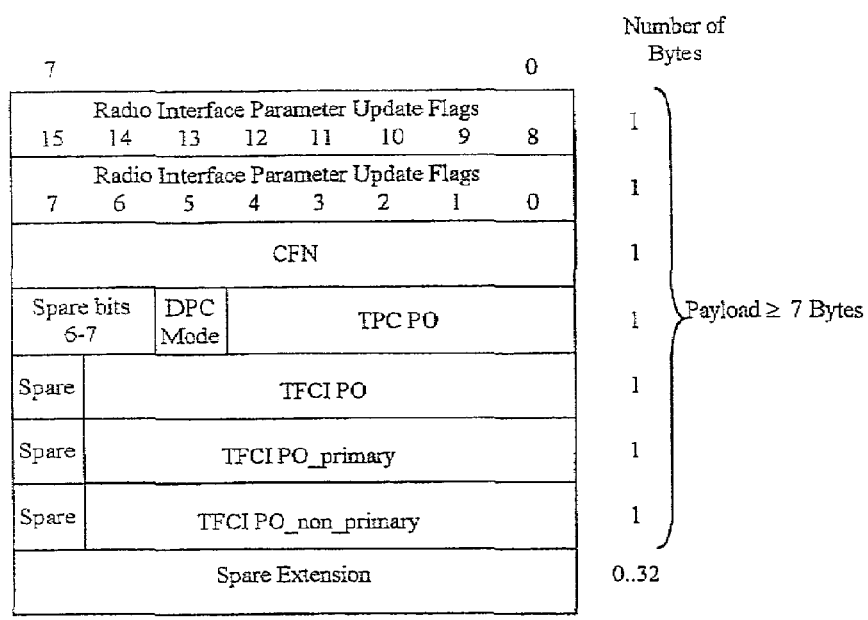
FIG. 29 shows a control frame format modified from the Radio Interface Parameter Update of the first and second embodiments of the present invention.
Figure 30:
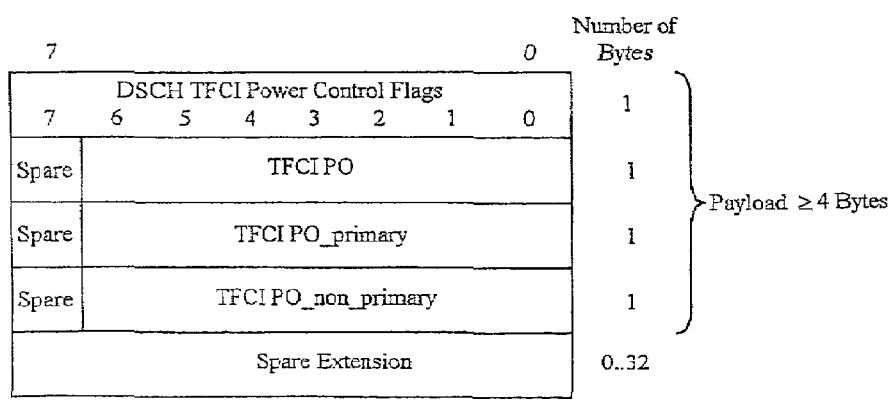
FIG. 30 shows a newly added control frame format for the first and second embodiments of the present invention.

FIG. 29 and FIG. 30 show the frame formats for the fourth embodiment.

In case of the frame format of FIG. 29, the TFCI power offset value is transmitted whenever the Radio Interface Parameter Update control frame is transmitted in the first procedure for the first method of the first embodiment and in the procedure for the first method of the second embodiment. In case of using the new frame format of FIG. 30, the TFCI power offset value is transmitted the DSCH TFCI POWER CONTROL frame is transmitted in the second procedure for the first method of the first embodiment and the second procedure of the first method of the second embodiment.

As shown in FIG. 29, the control frame format comprises 2 bytes of Radio Interface Parameter Update flags field, 1 byte of CFN information field, 1 vole of TPC power offset and DPC mode fields, 1 byte having at least 7 bits of the TFCI power offset (TFCI PO) field adapted to the DPCCHs that transmit the TFCI2 value during the associated DCH soft handover, TFCI power offset (TFCI PO_primary) field adapted to the DPCCH belonged to the primary cell among the DPCCHs that transmit the TFCI2 value during the associated DCH soft handover, and the TFCI power offset (TFCI PO_non_primary) field adapted to the DPCCH belong to the non-primary cell among the DPCCH that transmit the TFCI2 value during the associated DCH soft handover, in 7 bytes of frame payload.

As shown in FIG. 30, the control frame format comprises DSCH TFCI POWER CONTROL flags, 1 byte having at least 7 bits of the TFCI power offset (TFCI PO) field adapted to the DPCCHs that transmit the TFCI2 value during the associated DCH soft handover, TFCI power offset (TFCI_PO primary) field adapted to the DPCCH belonged to the primary cell among the DPCCHs that transmit the TFCI2 value during the associated DCH soft handover, and the TFCI power offset (TFCI PO_non_primary) field adapted to the DPCCH belong to the non-primary cell among the DPCCH that transmit the TFCI2 value during the associated DCH soft handover, in 4 bytes of frame payload.

Also, it is possible to transmit the parameters required in the first and third embodiments by carrying them in one frame format in the user plane (fifth embodiment).

In this case the frame formats of FIG. 24 and FIG. 25 are used.

In case of the frame format of FIG. 24, the TFCI power offset value is transmitted whenever the Radio Interface Parameter Update control frame is transmitted in the first procedure for the first method (Method-1a) of the first embodiment and in the first procedure for the first method (Method-3a) of the third embodiment.

In case of using the new frame format of FIG. 25, the TFCI power offset value is transmitted whenever the DSCH TFCI POWER CONTROL frame is transmitted in the second procedure for the first method (Method-1a) of the first embodiment and the procedure of the first method (Method-3a) of the third embodiment. Here, the TFCI PO is commonly used in the first procedure of the first method (Method-1a) of the first embodiment and the first procedure of the first method (Method-3a) of the third embodiment. The actual values of the parameters can be identical to or different from each other according to the circumstances.

Now, another embodiment of the present invention will be described hereinafter. A standard point of the DSCH power in the TFCI field of the associated DCH is converted into physical data channel (DPDCH) field, pilot field, and TPC field of the associated DCH.

The power of the TFCI field is controlled in respective Hard Split Mode and Logical Split Mode, the power control for the DPCCH field, pilot field, and TPC field becomes very simple because there exists no mode classification. In the DSCH TFCI signaling, the DSCH power offset signaling and the TFCI power offset can be signaled in the same setting.

If the TFCI field is in Hard Split Mode, respective two power offsets should be signaled for DSCH and TFCI. In this case, MAX (DSCH PO_primary, TFCI PO_primary) is defined by primary_MAX_pow and MAX (DSCH PO_non_primary, TFCI PO_non_primary) is defined by Non-primary_MAX_pow. In this case, the MAX (DSCH PO_primary, TFCI PO_primary) means a large value of the DSCH PO_primary and TFCI PO_primary, and the MAX (DSCH PO_non_primary, TFCI PO_non_primary) means a large value of the DSCH PO_non_primary and the TFCI PO_non_primary. The TFCI PO_primary and TFCI PO_non_primary are TFCI power offsets of the primary and non primary cells, respectively, and also respectively means the DOSCH power offset in the DSCH PO_primary and DSCH PO_non_primary cell, or Non-primary cell.

Accordingly, the primary_MAX_pow and non-primary_MAX_pow signalings are performed by the power offset of the TFCI field in the Hard Split Mode. That is, the primary_MAX_pow and the non-primary_MAX_pow are included in the Radio Link Setup message and the Radio Link Reset Prepare message in the power offset field so as to be signaled at the same time.

As describe above, in the present invention the TFCI field for DSCH is controlled separately from the DCH in power when the DSCH-associated DCH is in situation of the soft handover, the TFCI reception quality for the DSCH can be enhanced.

Also, in the present invention, since the message, frame format, and the procedures for transmitting the TFCI power control information are defined as for the respective control plane and the user plane in the DSCH hard split mode, the TFCI power control can be performed for the DSCH hard split mode in the 3GPP asynchronous system and terminal.

Furthermore, since the present invention uses the control message and frame format and procedures it is possible to inform the TFCI power offset value that is appropriately set in any situation such as initial radio link setup, movement of the mobile station, and change of the number of the radio links that transmit the TFCI2.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a transmission power of a transport format combination indicator (TFCI) for a downlink shared channel (DSCH), in a mobile station communicating with at least one base station through a dedicated channel (DCH) comprising:
   receiving the TFCI from a base station;
   determining whether the base station is a primary base station; and
   controlling the transmission power of the TFCI using a power offset to be used with respect to an associated DCH according to a result of the determining.

2. The method of claim 1, wherein the TFCI for the DSCH is described by a code word which is different from a code word of a TFCI for the DCH.

3. The method of claim 1, wherein the DCH includes a dedicated physical data channel (DPDCH) and a dedicated physical control channel (DPCCH).

4. The method of claim 3, wherein the TFCI is received through the DPCCH.

5. The method of claim 1, wherein the primary base station is determined using a site selection diversity transmit (SSDT) operation.

6. The method of claim 1, wherein when the base station transmitting the TFCI is the primary base station, the power offset is greater than when the base station transmitting the TFCI is a non-primary base station.

7. The method of claim 1, wherein the power offset is determined based on a number of radio links connected to the mobile station and a number of radio links transmitting the TFCI.

8. A method for controlling a transmission power of a transport format combination indicator (TFCI) for a downlink shared channel (DSCH) in a mobile station communicating with at least one base station through a dedicated channel (DCH), comprising:
   measuring a first signal to interference ratio (SIR) using pilot signals in a dedicated physical control channel (DPCCH);
   measuring a second SIR using TFCI signals in the DPCCH; and
   independently controlling a transmission power of the DCH and the TFCI for the DSCH based on the measured first and second SIRs.

9. A method of transmitting power control information for a transport format combination indicator (TFCI) for a downlink shared channel (DSCH) in a second radio network controller (RNC), when a mobile station performs handover from an area of a first RNC to an area of the second RNC, comprising:
   receiving from the first RNC, a control frame including a parameter for controlling a transmission power for the TFCI for the DSCH; and
   transmitting to at least one base station in the second RNC, a control frame including the parameter.

10. The method of claim 9, wherein the TFCI for the DSCH is coded by a code word which is different from a code word of a TFCI for a dedicated channel (DCH).

11. The method of claim 9, wherein the handover is a soft-handover for a dedicated channel (DCH), and a hard-handover for the DSCH.

12. The method of claim 9, wherein the control frame is transmitted using a protocol on a user plane.

13. The method of claim 12, wherein the parameter is a power offset value for controlling the transmission of the power control value.

14. The method of claim 13, wherein the parameter is transmitted using a Radio Interface Parameter Update message in the control frame.

15. The method of claim 14, wherein the parameter includes a first power offset value and a second power offset value, and
   wherein the first power offset value is used when a base station transmitting the TFCI is a non-primary base station in the DCH handover, and the second power offset value is used when a base station transmitting the DSCH among base stations transmitting the TFCI is a primary base station in the DCH handover.

16. The method of claim 15, wherein the Radio Interface Parameter Update message comprises 6 octets, and wherein the first power offset value comprises a $5^{th}$ octet with 7 bits length.

17. The method of claim 16, wherein the second power offset value comprises a $6^{th}$ octet with 7 bits length.

18. The method of claim 17, wherein the Radio Interface Parameter Update Message includes a Radio Interface Parameter Update Flags field comprising a $1^{st}$ octet and $2^{nd}$ octet, and wherein a third bit of the Radio Interface Parameter Update Flags field indicates whether a valid first power offset value is included and a fourth bit indicates whether a valid second power offset value is included.

19. The method of claim 9, wherein the parameter is transmitted using a dedicated control frame.

20. The method of claim 9, further comprising:
receiving, from the first RNC, an indicator indicating whether the parameter is included; and
transmitting to the selected at least one base station, the indicator indicating whether the parameter is included.

21. The method of claim 20, wherein the indicator is received and transmitted using a Radio Link Setup message from the first RNC.

22. The method of claim 20, wherein the indicator is received and transmitted using a Radio Link Reconfiguration Preparation message to the selected at least one base station.

23. The method of claim 20, further comprising:
receiving from the at least one selected base station which supports the TFCI power control, a Radio Link Setup message including a TFCI power control support indicator; and
transmitting, to the first RNC, a Radio Link Setup message including a TFCI power control support indicator.

* * * * *